(12) United States Patent
Schooler et al.

(10) Patent No.: US 6,667,708 B2
(45) Date of Patent: Dec. 23, 2003

(54) METHOD AND SYSTEM FOR A PROGRAMMABLE CODE GENERATOR

(75) Inventors: Anthony Schooler, Bartlett, IL (US); David P. Gurney, Carpentersville, IL (US); Yun Kim, Hoffman Estates, IL (US); William John Rinderknecht, Austin, TX (US); Zhuan Ye, Buffalo Grove, IL (US); Benson Chau, Mt. Prospect, IL (US)

(73) Assignee: Motorola, Inc., Schaumburg, IL (US)

( * ) Notice: Subject to any disclaimer, the term of this patent is extended or adjusted under 35 U.S.C. 154(b) by 69 days.

(21) Appl. No.: 10/034,554

(22) Filed: Dec. 28, 2001

(65) Prior Publication Data

US 2003/0122697 A1 Jul. 3, 2003

(51) Int. Cl.[7] ............................................. A04L 15/28
(52) U.S. Cl. ................................. 341/173; 340/825.69
(58) Field of Search ............................. 341/173, 176; 340/825.69; 370/335, 209, 342

(56) References Cited

U.S. PATENT DOCUMENTS

| | | | | |
|---|---|---|---|---|
| 5,228,054 A | * | 7/1993 | Rueth et al. ................. | 708/252 |
| 5,600,847 A | * | 2/1997 | Guttag et al. ................. | 712/36 |
| 5,623,485 A | * | 4/1997 | Bi .............................. | 370/209 |
| 5,629,955 A | * | 5/1997 | McDonough ............... | 375/351 |
| 5,835,488 A | * | 11/1998 | Sugita ........................ | 370/335 |
| 6,005,888 A | * | 12/1999 | Barron ....................... | 375/140 |
| 6,054,832 A | * | 4/2000 | Kunzman et al. ........... | 318/600 |
| 6,141,374 A | * | 10/2000 | Burns ......................... | 375/152 |
| 6,154,101 A | * | 11/2000 | Zou et al. .................... | 331/78 |
| 6,411,980 B2 | * | 6/2002 | Yoshida ..................... | 708/709 |
| 6,442,152 B1 | * | 8/2002 | Park et al. .................. | 370/341 |
| 6,445,714 B1 | * | 9/2002 | d'Anjou et al. ............. | 370/441 |

FOREIGN PATENT DOCUMENTS

| | | |
|---|---|---|
| EP | 0 994 573 A2 | 4/2000 |
| WO | WO 00/31622 | 6/2000 |

* cited by examiner

*Primary Examiner*—Michael Horabik
*Assistant Examiner*—Hung Dang
(74) *Attorney, Agent, or Firm*—Kenneth A. Haas

(57) ABSTRACT

The invention provides a method for generating a code sequence. A code-generation instruction is received from memory. One or more control signals are determined based on the code-generation instruction. A code sequence is generated based on the control signals, a current state input, and a mask input.

21 Claims, 13 Drawing Sheets

METHOD AND SYSTEM FOR A PROGRAMMABLE CODE GENERATOR

FIELD OF THE INVENTION

This invention generally relates to the generation of pseudo-random, spreading, orthogonal and synchronization codes for use in wireless communications and encryption applications. In particular, the invention relates to a programmable code generator for generating code sequences.

BACKGROUND OF THE INVENTION

New code division, multiple-access (CDMA) standards are being developed at a fast rate, and these new standards require increasingly complex pseudo-random noise and code sequence generation. Pseudo-random noise or pseudo-noise (PN) sequences are commonly used in direct sequence spread spectrum communication systems such as that described in the IS-95 specification (ANSI/TIA/EIA-95-B-1999) entitled "Mobile Station-Base Station Compatibility Standard for Wideband Spread Spectrum Cellular Systems" (1999), published by the Electronic Industries Association (EIA), 2500 Wilson Blvd., Arlington, Va., 22201.

The IS-95 specification and its derivatives incorporate CDMA signal modulation techniques to conduct multiple communications simultaneously over the same RF bandwidth. Each base station and user communicating with the base station in a CDMA system may employ individually assigned PN code sequences for spread-spectrum "spreading" of the channels. The assigned PN code sequence is a sequence of a predetermined number of bits. For each user transceiver, the PN code sequence may be used to spread data transmitted by the transceiver and to de-spread data received by the transceiver.

Each bit-period, or phase transition, of the PN code sequence may be defined as a chip, which is a fraction of the bit-period for each data symbol. Consequently, the PN code sequence may be combined with the data sequence so as to spread the frequency spectrum of the data. In IS-95, for example, 64 chips represent one data symbol. Each user may also be assigned a different Walsh code to orthogonalize the spread communication channel.

Demodulation of a spread signal received from a communication channel requires synchronizing a locally generated version of the PN code sequence with the embedded PN code sequence in the spread signal. The synchronized, locally generated PN code sequence may be correlated against the received signal to extract the cross-correlation. The signal of the extracted cross-correlation is the de-spread data signal.

Details of a method for PN vector generation may be found in the patent entitled "Method and Apparatus for Generating Multiple Matched-Filter PN Vectors in a CDMA Demodulator" by G. F. Burns, EPO994573, published Apr. 19, 2000. Another example of a PN generator may be found in Q. Zou et al., "Fast Slewing Pseudorandom Noise Sequence Generator," WO 00/31622, published Jun. 2, 2000.

Prior art has many examples of more traditional code generators, all of them with code generators that are constructed by using dedicated hardware. The sole purpose of the dedicated hardware is to generate a particular type of code. State variables may be stored in dedicated flip-flops or registers, and read by a predetermined set of hardware blocks whose function is determined by the wiring of the blocks. Mathematical and logical manipulations performed by these blocks are reasonably fixed in the type and order of the operations. Although parameters can sometimes alter the function of the hardware, such as changing the mask of a PN generator, their functionality is essentially that of unchanged traditional, fixed-function dedicated hardware and circuits.

Although building code generators in dedicated hardware may result in a very low cost solution, hardware is not very flexible and after it is built, changes are not made easily. Also, dedicated hardware resources cannot be reused for other operations, for example, moving from PN code generation with linear feedback shift register (LFSR) PN hardware to Walsh code generation. This is especially true for a multi-mode receiver or transmitter where codes can be completely different, or not required at all in particular protocols. Dedicated hardware may not work well, for example, within a software-centric approach to a radio transceiver, as in a software-defined radio. If a receiver or transmitter is implemented in software, software-implemented code generation may also be preferred.

Because preferred CDMA platforms should be able to support old, new and future CDMA standards, a highly flexible PN sequence generator is needed. A flexible PN generation architecture must have a high throughput capability to be able to support higher rate PN and orthogonal sequences, and be able to slew or advance the state of the PN generator quickly. Often CDMA signal processing integrated circuits are being developed before the standards are finalized, and when the standards change after hardware has already been released, costly and time-consuming reworks may be required unless a flexible solution is available.

There continues to be a need for highly adaptable receivers and transmitters that can handle multiple protocols in a single piece of hardware. Emerging multi-mode receivers and transmitters must support multiple CDMA standards, for example, IS-95A/B, IS-2000, and 3GPP. Each of these CDMA protocols requires a different set of CDMA codes that must be generated and manipulated in different ways. Using separate hardware for each new protocol may not be cost-effective, adaptable or practical. Alternatively, performing the code generation in software on a general-purpose DSP may be difficult because of the extremely large MIPs (millions of instructions per second) requirements, power requirements that may exceed restrictions in portable devices, and limitations on clock frequency that may prevent it from generating the required code at sufficiently rapid rates.

A preferred code generator, in particular a PN code generator, would be flexible enough to support multiple standards, multi-mode receivers and transmitters, as well as orthogonal code generation on the same hardware. A preferred PN generator would accommodate the generation of many different types of spreading codes, for example, LFSR, maximal-length m-sequences, Gold sequences, and orthogonal covering codes such as Walsh or orthogonal variable spreading factor (OVSF) codes. It would accommodate the increased lengths and parallel code-generation requirements that are limited by fixed hardware. The code-generation unit would support other special purpose codes, such as synchronization codes. The code-generation architecture would allow extended length PN sequences and parallel generation of code chips, with consideration for low power consumption, low voltage, low operating frequencies, and code-generation rate requirements.

The object of this invention, therefore, is to provide a method and a system for high throughput code generation, with a high level of flexibility to generate varied codes in CDMA and multi-protocol systems, and to overcome the deficiencies and obstacles described above.

SUMMARY OF THE INVENTION

One aspect of the invention provides a method for generating a code sequence, including the steps of receiving a code-generation instruction, determining control signals based on the code-generation instruction, and generating the code sequence based on the control signals, a current state input, and a mask input.

The generated code sequence may be a spreading code, a covering code, an orthogonal code, a synchronization code, a pseudo-noise code, a slewed pseudo-noise code, an arbitrary-length pseudo-noise code, an m-sequence code, a Walsh code, an orthogonal variable spreading factor code, a Gold code, a 3GPP hierarchical code, a frequency-corrected code sequence, a user-defined code sequence, or a predefined code sequence. The code-generation instruction may be a logic instruction, an arithmetic instruction, a shift instruction, a rotate instruction, a move instruction, a pack instruction, an unpack instruction, a flip instruction, a load instruction, a pseudo-noise generate instruction, a multiple pseudo-noise generate instruction, a Walsh generate instruction, or a multiple Walsh generate instruction.

A set of terms for a next state input may be generated based on the control signals, the current state input, and the mask input. A plurality of intermediate terms may be stored in a register file, and M sequential bits of a specified pseudo-noise code sequence may be generated, where M is the length of the generated pseudo-noise vector. Multiple elements of a code sequence may be generated in parallel, based on the control signals, the current state input, and the mask input.

Another aspect of the current invention is a code-generation system, containing a means for receiving a code-generation instruction, a means for determining control signals based on the code-generation instruction, and a means for generating the code sequence based on the control signals, a current state input, and a mask input.

The system may contain a means for generating a set of terms for a next state input based on the control signals, the current state input, and a mask input. The system may also contain a means for storing a plurality of intermediate terms in a register file, and a means for generating M sequential chips of a specified pseudo-noise code sequence, wherein M is a length of a generated pseudo-noise vector. The system may contain a means for generating multiple elements of a code sequence in parallel based on the control signals, the current state input, and the mask input.

Another aspect of the current invention is a code-generation system, comprising an instruction memory, an instruction decoder connected to the instruction memory, a code-generation arithmetic logic unit connected to the instruction decoder, and a register file connected to the instruction decoder and the code-generation arithmetic logic unit, where code may be generated by the arithmetic logic unit from a current state input, mask input from the register file, and control signals that are determined by the instruction decoder based on an instruction received from the instruction memory.

The code-generation system may include a temporary storage register, where results from several arithmetic logic unit operations may be stored. The code-generation system may include a carry register, where intermediate results from the code-generation arithmetic logic unit may be stored. The code-generation system may include a correlation arithmetic logic unit connected to the code-generation arithmetic logic unit, where code may be transferred to the correlation arithmetic logic unit from the code-generation arithmetic logic unit. The code-generation system may include one or more general-purpose arithmetic logic units connected to the register file, where the resources of the register file may be shared between the general-purpose arithmetic logic units and the code-generation arithmetic logic unit.

Another aspect of the current invention is a method for generating code comprising selecting a code type, generating a plurality of instructions based on the selected code type, and storing the instructions in a code-generation instruction memory. The code-generation instruction memory may be located in a multi-mode transceiver. The code-generation instruction memory may be located in an encryption device.

Another aspect of the current invention is a computer usable medium including a program for generating a code sequence for selecting a code type, for generating a plurality of instructions based on the selected code type, and for storing the instructions in a code-generation instruction memory. The computer program code may reside in a software-defined radio.

Another aspect of the current invention is a programmable code-generation system, including a means for selecting a code type, a means for generating a plurality of instruction based on the selected code type, and a means for storing the instructions in a code-generation instruction memory.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
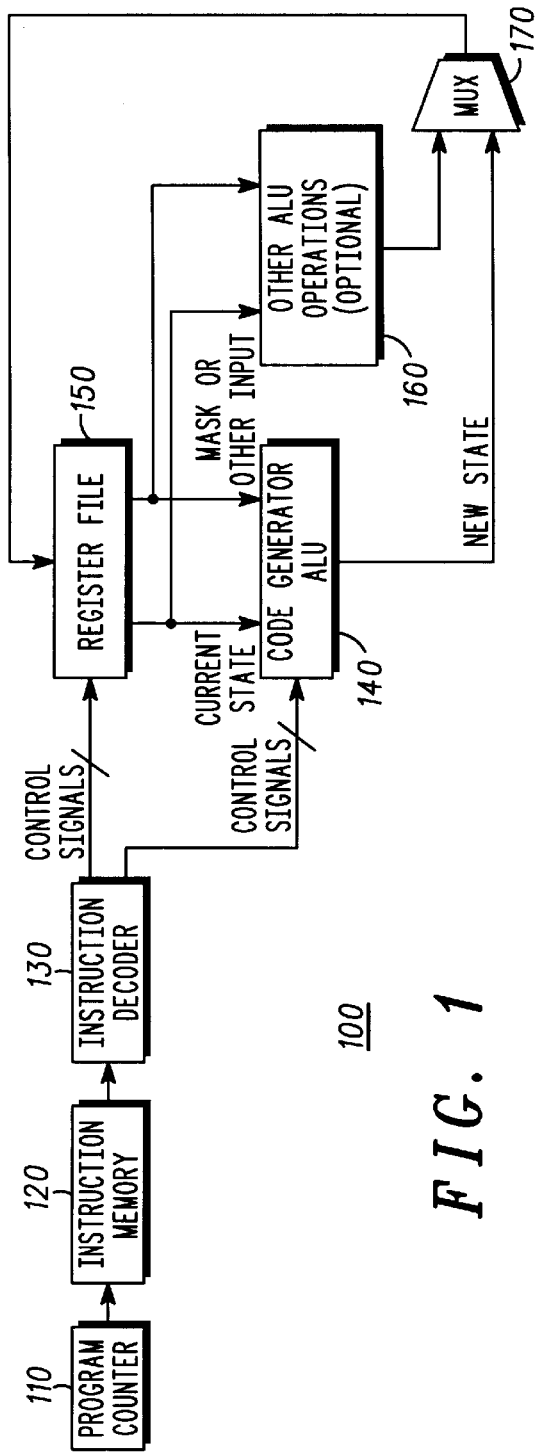
FIG. 1 is a block diagram of one embodiment of a programmable code generator, in accordance with the current invention.

The present invention provides a programmable code generator for high throughput code generation by generating multiple PN or code chips per clock cycle, using a fully parallel high-speed approach or a more flexible hybrid approach, with lower power consumption and at potentially low clock speeds. Look-ahead transformations may be incorporated in software to generate multiple code chips per clock cycle. The programmable code generator offers a highly programmable instruction set and ALU-based code generation for many different codes used in CDMA and encryption systems. The programmable code generator is capable of generating many PN, orthogonal and synchronization codes. The programmable code generator is readily scalable, allowing flexible PN or code generation of arbitrary length codes. Arbitrary length codes may be generated with accumulator and carry functions. The programmable code generator may also provide specific PN stewing or PN offset support for correlation purposes.

Code-generation instructions may be incorporated into the processor's instruction-set architecture to facilitate the generation of many different types of spreading codes (e.g. PN, parallel or multi-chip PN, PN slewing, LFSR, arbitrary length PN, maximal length m-sequences, and Gold sequences) and orthogonal covering codes (e.g. Walsh and orthogonal variable spreading factor or OVSF codes). The code-generation ALU (arithmetic logic unit) may be specially designed to support all of these modes of operation. In addition, other special purpose codes, such as 3GPP hierarchical codes used in CDMA synchronization, may be generated with software, allowing a completely programmable and upgradeable code-generation unit. The code-generation ALU may generate frequency-corrected code sequences that may compensate for frequency offsets of a correlated signal. The code-generation ALU may generate a user-defined code sequence, a predefined code sequence, or any directly specified code sequence. The code-generation ALU may generate multiple code chips in parallel, even within a single instruction cycle.

The programmable code generator may be integral to multi-mode receivers and transmitters, and multi-standard communications modems, while adaptable to future standards and enhancements. The invention provides an architecture that allows code generation to be performed within a software-centric design in anticipation of a software-defined radio. By building a special purpose ALU to perform the mathematical operations for code generation, all code generation may simply be performed as another instruction (or set of instructions) within the software. This provides increased flexibility, increased re-use between protocols, and a friendlier approach to developing evolving DS-CDMA systems.

Operation of the PN generator may be controlled by special instructions that may be part of a portion of software. State variables, mask variables and other variables may be stored in a general-purpose register file instead of within dedicated (un-reusable) registers. The mathematical code-generation functions may be implemented in a highly flexible manner. The order of the mathematical functions may be completely altered for different protocols, or chained to generate longer codes. Associated software may make a determination of the code type to be generated and rapidly reconfigure the programmable code generator such that an information signal may be transmitted or received on a single piece of hardware using a variety of CDMA, wireless modem, network and encryption protocols for wired and wireless applications.

The present invention implements all code-generation functions with a flexible instruction set and special-purpose ALU hardware within a traditional microprocessor or microsequencer architecture. This is accomplished by incorporating a parallel code-generation arithmetic logic unit within a register file based processor architecture as shown in FIG. 1.

FIG. 1 shows a block diagram of one embodiment of a programmable code generator, in accordance with the present invention at 100. Program counter 110 may provide memory address information, pointed initially at the first stored code-generation instruction to execute a code-generation sequence, and then pointed at subsequent addresses as PN code is generated and the microcode is executed. Program counter 110 may point to the position of the next code-generation instruction residing in instruction memory 120.

Instruction memory 120 may contain microcode for generating various code sequences and for controlling actions of the ALU and associated registers. Instruction memory 120 may comprise non-volatile memory, volatile memory, or a combination of the two. Instruction memory 120 may include co-located registers, an array of memory cells, a storage device, or any suitable memory for storing instructions. The microcode may be executed to generate one or more types of code sequences. The microcode may be altered to generate updated code sequences, or to respond to varying protocols within a CDMA or encryption system. Instructions stored in instruction memory 120 may include one or more logical, arithmetic, ALU and register manipulation instructions. The instructions may be arranged in a sequence of individual instructions for the generation of code. For example, PN code-generation instructions may include one or more logic and arithmetic instructions; flip, shift, rotate, loop, move, pack, unpack and load instructions; correlate and multiple correlate instructions; PN generate and multiple PN generate instructions; Walsh generate and multiple Walsh generate instructions. Instructions may be provided to instruction decoder 130.

Instruction decoder 130 may provide control signals to code-generation ALU 140 and register file 150 in response to instructions from instruction memory 120. Instruction decoder 130 may provide control signals in response to instructions from a control register, another processor, a storage device, or any suitable memory. The control signals may be high or low voltages to enable, disable and control the flow of bits and words of various lengths within the programmable code generator. Control signals may enable, for example, the contents of a particular location in the register file, such as a mask input or a current state input, to be provided to code-generation ALU 140, or to transfer a new state output from code-generation ALU 140 to register file 150. Control signals may enable, for example, a logical operation such as XOR, AND or shift functions between two operands such as a state input and a mask input. Control signals may enable, for example, arithmetic operations such as add, multiply and divide functions between two operands. Control signals may facilitate the generation of PN code or other types of codes, or the generation of terms for the next state.

Code-generation ALU 140 may be comprised of a set of interconnected logic gates, latches, data paths, control paths and timing circuits that respond in a specified manner to any of the code-generation instructions. Code-generation ALU 140 may produce, for example, a new PN state corresponding to a current state and a mask input. The new PN state may be transferred to a suitable location in register file 150. Register file 150 may contain state and mask information.

Register file 150 may be comprised of an array of memory cells, arranged as a series of words. Each word in register file 150 may be addressed by address and control signal information from instruction decoder 130. The contents of registers in register file 150 may be read by code-generation ALU 140, or written to by code-generation ALU 140 in conjunction with control signals from instruction decoder 130 generated in response to instructions stored in instruction memory 120. Registers in register file 150 may optionally be accessible from additional logic circuits 160 or other hardware within programmable code generator 100.

Additional logic circuits 160 may include a correlation ALU or a general-purpose ALU. Data output from either code-generation ALU 140 or additional logic circuits 160 may be stored in register file 150, with the data path from either code-generation ALU 140 or additional logic circuits 160 selected using multiplexer (MUX) 170. Multiple general-purpose ALUs may be included in the system architecture. Those skilled in the art may recognize that other processor topologies are possible, such as very long instruction word (VLIW) processors, where functional units such as the code-generation ALU and general-purpose ALUs read and write their results simultaneously (i.e., in the same instruction cycle). Thus, multiplexer 170 may not be present in all embodiments of the invention. Programmable code generator 100 may generate a wide variety of PN, spreading, covering, orthogonal and synchronization codes and code sequences by executing a series of code-generation instructions or microcode.

Figure 2:
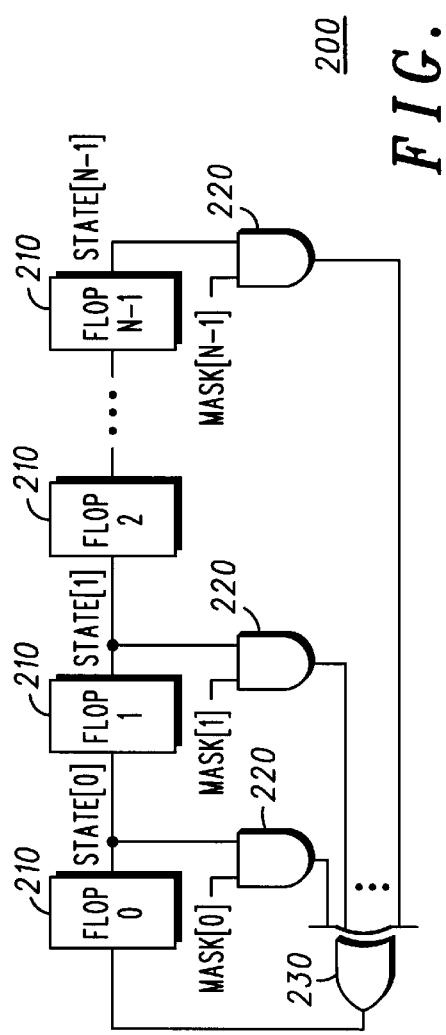
FIG. 2 is a block diagram of a traditional form of a PN code sequence generator.

A block diagram of a traditional form of a PN code sequence generator is shown in FIG. 2. Traditional PN code sequence generator 200 may contain a series of N latches or flip-flops 210 arranged as a linear feedback shift register (LFSR), where N is dictated by the particular communication protocol, and is equal to the number of delay elements or the polynomial degree. Upon the transition of a clock or timing signal, the contents of flip-flop 0 may be transferred to flip-flop 1, while the contents of flip-flop 1 may be transferred to flip-flop 2, and similarly for each flip-flop in the shift register. The outputs of flip-flops 0 through N–1 may comprise the current state [N–1:0] of the PN sequence generator. The next state of [N–1:0] may be determined by the shifted state of flip-flop 0 through N–1, along with the input to flip-flop 0. The input to flip-flop 0 may be determined by combinational logic 220 and reduction logic 230. Combinational logic 220 may contain a set of AND logic gates. Reduction logic 230 may contain a set of XOR logic gates. Reduction logic 230 may generate an output bit based on the current state [N–1:0] combined with mask input [N–1:0]. Mask input [N–1:0] acts with current state [N–1:0], resulting in a modulo-2 multiply or a logical AND operation on each pair of current state and mask input bits. For example, if the mask input at a given flip-flop is a logical "0", the output of the logical AND operation may be a logical "0". Alternatively, if the mask input at a given flip-flop is a logical "1", the output of the logical AND operation may be the current state input. Reduction logic 230 may provide an output bit that corresponds to a modulo-2 addition of all the masked states. It is known in the art that the modulo-2 addition of two or more code phases (cyclic shifts or time delays) of an m-sequence may produce a third code phase of the same m-sequence. This property may be useful for quickly advancing the code phase or state of the code generator. The output of reduction logic 230 may be fed to flip-flop 0. Upon each consecutive clock cycle, a next state may be generated, the next state depending only on the mask input and current state input. The sequence may be initialized by a seed state stored in register file 150 as in FIG. 1, and transferred to flip-flops 0 through N–1. Mask input [N–1:0] may be stored in register file 150 of width K and transferred to the modulo-2 multiplication logic. In typical implementations, K may be equal to the data path widths (in bits), though this is not strictly required by the invention. The width K may be 40 bits, for example. If N>K, the Mask input [N–1:0] may be broken up into parts and stored in several different register locations.

A PN sequence bit may be defined by the general polynomial given by:

$$P(x) = g_{N-1}x^{N-1} + g_{N-2}x^{N-2} + \ldots + g_1 x + g_0, \quad (1)$$

where $g_r$ are feedback coefficients and $x^i$ are states or outputs from consecutive stages of the LFSR. The feedback coefficients may be tapped from appropriate points off the LFSR. If a Fibonacci form were used, a PN sequence generator would have the structure shown in FIG. 2. According to modulo-2 multiplication, if $g_r$ is one, then the feedback is added in; if $g_r$ is zero, the feedback is not added in. The coefficients $(g_0, g_1, \ldots 9_{N-1})$ may be referred to as the PN mask, and the PN state may be referred to as the current state of the shift register.

The structure in FIG. 2 may generate one new PN bit at a time. To generate multiple PN bits at once, look-ahead techniques may be employed to generate multiple PN outputs at a time.

In order to allow high-speed parallel PN generation, the normally sequential code-generation process may be transformed into a process that allows parallel next state input terms to be generated. Typically, this would require knowing future states of the code generator, which may depend on outputs from current states of the hardware. Parallel PN generation may be effectively achieved by using a look-ahead transformation process, without requiring accelerated transitions through the code sequences or large amounts of hardware.

The PN sequence generator polynomial may be generalized as follows:

$$P(x) = a_N x^N + a_{N-1} x^{N-1} + a_{N-2} x^{N-2} + \ldots + a_1 x + a_0, \quad (2)$$

where $a_i \in \{0,1\}$, and $0 \leq i \leq N$. In general, $a_N = a_0 = 1$. If Equation 2 is written as a difference equation, the following expression may be obtained:

$$x[n] = a_{N-1} x[n-1] + a_{N-2} x[n-2] + a_{N-3} x[n-3] + \ldots + a_1 x[n-N+1] - a_0 x[n-N] \quad (3)$$

where n is an index corresponding to a particular clock cycle or output of the LFSR. From (3), it may be seen that x[n] is a function (f) of $\{x[n-N], x[n-N+1], \ldots, x[n-1]\}$. Equivalently, $$x[n] = f\{x[n-N], x[n-N+1], \ldots, x[n-1]\} \quad (4)$$

Figure 3:
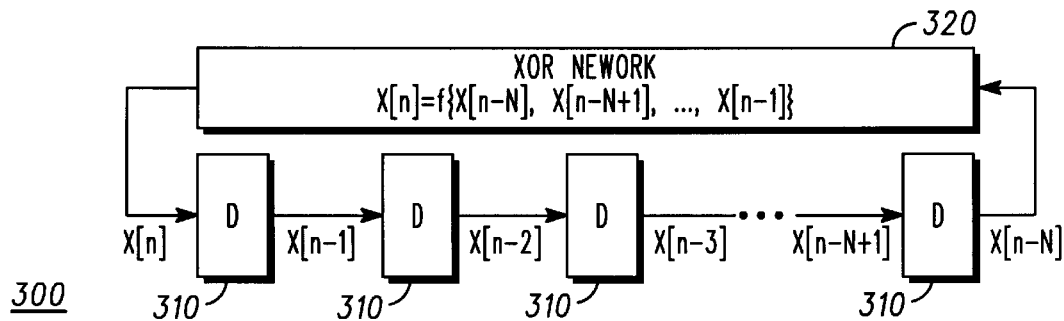
FIG. 3 is a block diagram of a linear feedback shift register implementation of a PN sequence generator.

Equation (4) represents the traditionally popular linear feedback shift register implementation of PN sequence generators in the prior art, as shown in general in FIG. 3.

FIG. 3 shows a block diagram of a linear feedback shift register implementation of a PN sequence generator at 300. PN sequence generator 300 may contain a set of D-type flip-flops 310, serially connected to form the shift register. Combinational and reduction logic 320 may provide a single-bit output x[n] to the first D-type flip-flops in the shift register. Subsequent D-type flip-flops 310 may contain output information x[n−1], x[n−2], . . . x[n−N] from earlier operations by combinational and reduction logic 320. Note that the XOR network reduction circuitry may produce an output that is equivalent to an odd parity check operation of its inputs (i.e., the output is equal to a logical one when an odd number of inputs are equal to a logical one).

PN sequence generator 300 has a drawback of producing only one new PN bit (or chip) per clock cycle. To implement a multi-chip (M-chip) PN sequence generator, Equation (4) may be duplicated M times by increasing the index n:

$$x[n] = f\{x[n-N], x[n-N+1], \ldots, x[n-1]\} \quad (5a)$$

$$x[n+1] = f\{x[n-N+1], x[n-N+2], \ldots, x[n]\} \quad (5b)$$

$$x[n+2] = f\{x[n-N+2], x[n-N+3], \ldots, x[n+1]\} \quad (5c)$$

$$x[n+M-1] = f\{x[n-N+M-1], x[n-N+M], \ldots, x[n+M-2]\} \quad (5d)$$

Equations (5a)–(5d) may provide a simple solution to generate multiple PN chips in parallel, though these M equations are dependent on each other. That is, x[n] must be generated before x[n+1] can be generated, and x[n+2] in turn may not be generated until x[n+1] is generated. An implementation based on Equations (5a)–(5d) potentially creates an unreasonably long data path that grows linearly with M. Alternatively, M different masks with increasing code phase offsets may be applied, at the expense of additional memory to store all of the masks.

An improved solution is to apply a look-ahead transformation to (4). A new recursive equation may be obtained that is dependent on a new function (g):

$$x[n] = g\{x[n-M-N], x[n-M-N+1], \ldots, x[n-M-1]\} \quad (6)$$

where M is the degree of look-ahead (M>1). By increasing the index n in (6), M independent recursive equations may be obtained:

$$x[n] = g\{x[n-M-N], x[n-M-N+1], \ldots, x[n-M-1]\} \quad (7a)$$

$$x[n+1] = g\{x[n-M-N+1], x[n-M-N+2], \ldots, x[n-M]\} \quad (7b)$$

$$x[n+2] = g\{x[n-M-N+2], x[n-M-N+3], \ldots, x[n-M+1]\} \quad (7c)$$

$$x[n+M-1] = g\{x[n-N-1], x[n-N], \ldots, x[n-2]\} \quad (7d)$$

Figure 4:
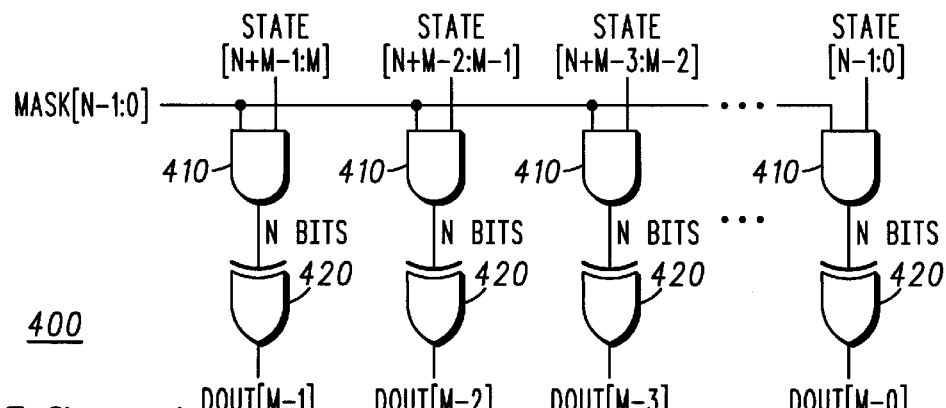
FIG. 4 is a logic diagram of one embodiment of a multi-chip PN sequence generator, in accordance with the current invention.

Grouping these M equations together, an M-element PN vector [x[n], x[n+1], x[n+2], . . . , x[n+M−1]] is a new function of an (N+M−1)-element vector [x[n−M−N], x[n−M−N+1], . . . , x[n−2]]. The new function essentially looks ahead M elements into the code sequence, instead of just one element as in typical PN generators. This function may be applied with the same masking circuitry (i.e., combinational logic 220) as described above. Based on Equations (7a)–(7d), a high-speed, feedback-free data path may be constructed to generate multiple PN chips in parallel. A feedback-free data path may allow very high-speed implementations of the design. The propagation delay of this data path may be only slightly larger than the traditional LFSR structure, in part due to potentially increased capacitive loading of the data path. In FIG. 4, an embodiment of Equations (7a)–(7d) is shown.

FIG. 4 shows a logic diagram of one embodiment of a multi-chip PN sequence generator, in accordance with the present invention at 400. Multi-chip PN sequence generator 400 may contain an array of combinational and reduction logic. Combinational logic 410 may be comprised of N 2-input AND gates, the output of which may be N bits feeding into reduction logic 420. Equivalently, reduction logic 420 may include M parallel N-bit modulo-2 adders, such as 2-input XOR gates. Each modulo-2 adder may read a mask input (mask [N−1:0]) whose values may be the coefficients of function g in Equations (7a)–(7d).

$$\{x[n-2N+1], x[n-2N+2], \ldots, x[n-3], x[n-2]\} \rightarrow \text{state}[2N-1:1] \quad (8)$$

$$\{x[n], x[n+1], x[n+2], \ldots, x[n+M-1]\} \rightarrow \text{dout } [M-1:0] \quad (9)$$

Equation (9) shows that M code bits may be generated in parallel, requiring only that state inputs [N+M−1:0] and mask input [N−1:0] be known. These state values may be pre-calculated and stored in register file 150 of width K as in FIG. 1. If (N+M)>K, the state inputs [N+M−1:0] may be broken into many parts and stored in several different register file locations.

A common drawback of the prior art's PN sequence generator with N storage elements, as shown in FIG. 3, is that it can only generate PN sequences with a length less than $2^N$. The number of storage elements or D-type flip-flops in the LFSR limits the length of the pseudo-noise sequence. For sequences with length larger than $2^N-1$, a new architecture comprising additional shift registers and accumulator logic may be needed for the LFSR structure.

Figure 5:
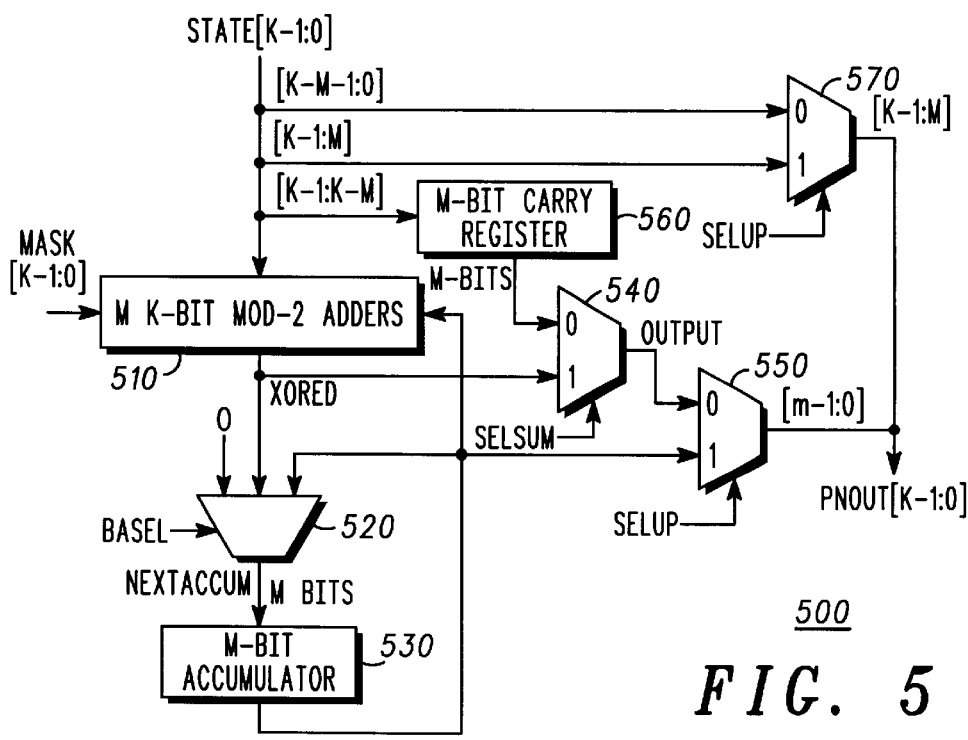
FIG. 5 is a block diagram of one embodiment of a programmable high-speed parallel PN code sequence generator, in accordance with the current invention.

FIG. 5 shows a block diagram of one embodiment of a programmable high-speed parallel (multi-chip) PN sequence generator, in accordance with the present invention at 500. The architecture may support parallel (M-chip) PN sequence generation with arbitrary length N.

Programmable parallel PN sequence generator 500 shows one embodiment of this architecture with parameters N, M, and K. N is the natural length of the PN state vector (or generator polynomial degree), M is the length of the generated PN vector (i.e., the number chips generated in parallel), and K is the width of the registers used as storage. In general, M≦N and M≦K. Programmable parallel PN sequence generator 500 may be comprised of combination and reduction logic blocks 510; multiplexers 520, 540, 550 and 570; M-bit accumulator 530, and carry registers 560. Combinational and reduction logic blocks 510 (AND-XOR) may have two input ports, state [K−1:0] and mask [K−1:0]. Their function may be similar to that shown in 400. Values for state [K−1:0] and mask [K−1:0] may be stored in register file 150 of FIG. 1. The state and mask input may be reduced by combination and reduction logic blocks 510 to generate the next M PN chips in parallel. If the PN state is less than K bits (N+M<K), the new M chips (dout [M−1:0]) may be routed through multiplexer 540 and multiplexer 550, appended to a portion of the current state bits (state [K−M−1:0]) through multiplexer 570, and routed to the output port (PNout [K−1:0]). The throughput of this operation may result in M chips per clock cycle. Control signals selUp, selSum and baSel may assist the timing and flow of the code generation.

If the required PN state is larger than N bits, a portion of the PN state and mask may first be read and intermediate results passed through multiplexer 520 and stored in M-bit accumulator 530. Control signal baSel (bit accumulator select) may be set to pass the intermediate results. Control signal baSel may also be set to inject logical zeros into M-bit accumulator 530 for initialization purposes. In the next cycle, another portion of the PN state and mask may be processed and then accumulated with the previous results. In parallel with this operation, the current portion of the PN state may be updated by reading M most-significant bits of the previous portion of the PN state from M-bit carry register 560 and routed to the M least-significant bits of the output port (PNout [M−1:0]). The remaining most-significant bits of the output port (PNout [K−1:M]) may contain the left-shifted (by M bits) version of the current state input (state [K−M−1:0]). After the last portion of the PN state is processed, the valid M-bit PN chips may be appended to the first portion of the PN state and routed to the output port. With this mechanism, the data path can support PN sequence generation with arbitrary length N. Combinational and reduction logic blocks 510 may be comprised of multiple (M) sets of N-bit modulo-2 adders.

Figure 6:
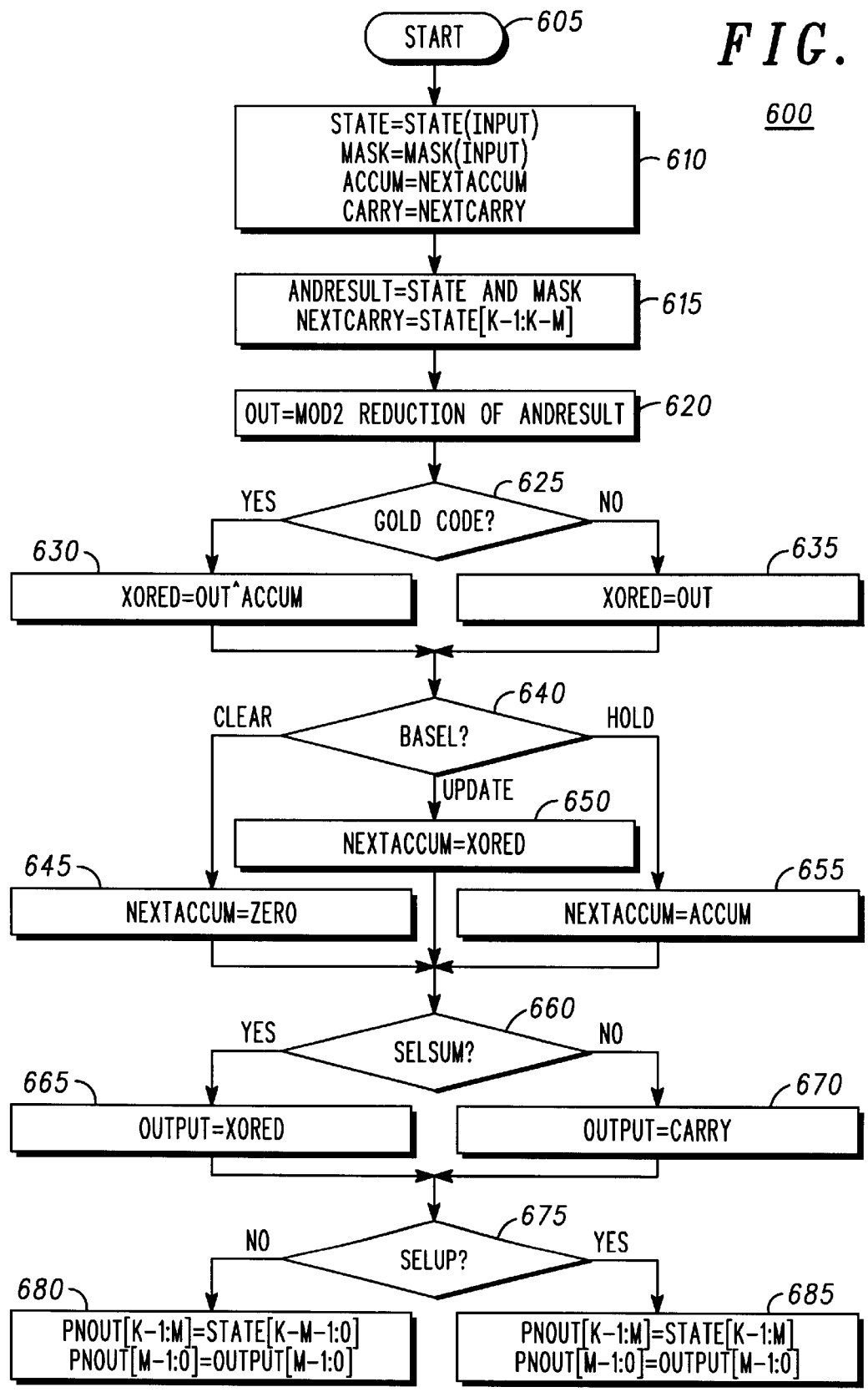
FIG. 6 is a flow chart of one embodiment of a method for generating a code sequence, in accordance with the current invention.

FIG. 6 shows a flow chart of one embodiment of a method for generating a code sequence, in accordance with the present invention at 600. Code-generation sequence 600 may be comprised of steps to generate various types of code sequences.

As shown at block 605, code-generation sequence 600 may be initiated. A state input state may be set equal to the initial state values, a mask input mask may be set equal to the desired mask values, the accumulator input accum set equal to the NextAccum values, and the input carry may be set equal to the NextCarry values, as shown at block 610. An intermediate result, andResult, may be provided by AND operations between state and mask, and another intermediate result, NextCarry, may be generated from values of state [K−1:K−M], as shown at block 615. An intermediate output out may be determined by modulo-2 reduction of andResult, as shown at block 620. As shown at block 625, a Gold code may be desired. If so, an intermediate output xored may be generated from intermediate output out and accum as shown at block 630. That is, a Gold code may be generated by XORing the output of one (upper or X) m-sequence generator with another (lower or Y) m-sequence generator through the use of the accumulator. If a Gold code is not desired, then xored may be set equal to out as shown at block 635. As shown at block 640, if the control signal baSel is set to clear, then NextAccum may be set equal to zero as shown in block 645. If the control signal baSel is set to update, then NextAccum may be set equal to xored as shown at block 650. If the control signal baSel is set to hold, then NextAccum may be set equal to accum as shown at block 655. As shown at block 660, if the control signal selSum is equal to a logical one, then an intermediate value output may be set equal to xored, as shown at block 665. As shown at block 660, if the control signal selSum is equal to a logical zero, then an intermediate value output may be set equal to carry, as shown at block 670. As shown at block 675, if control signal selUp is equal to a logical zero, then the final value PNout may be set equal to a combination of state [K−M−1:0] and output [M−1:0], as shown at block 680. As shown at block 675, if control signal selUp is equal to a logical one, then the final value PNout may be set equal to a combination of state [K−1:M] and accum [M−1:0], as shown at block 685.

Alternative embodiments of the programmable code generator that may not require additional state information are possible. These implementations may rely on feed-forward paths within the XOR reduction network to forward next state information. Thus, the operating clock frequency may be lower in such implementations, decreasing with the level of parallelism. These implementations may be more flexible in some ways, for example, by readily allowing single stepping through code sequences.

Figure 7:
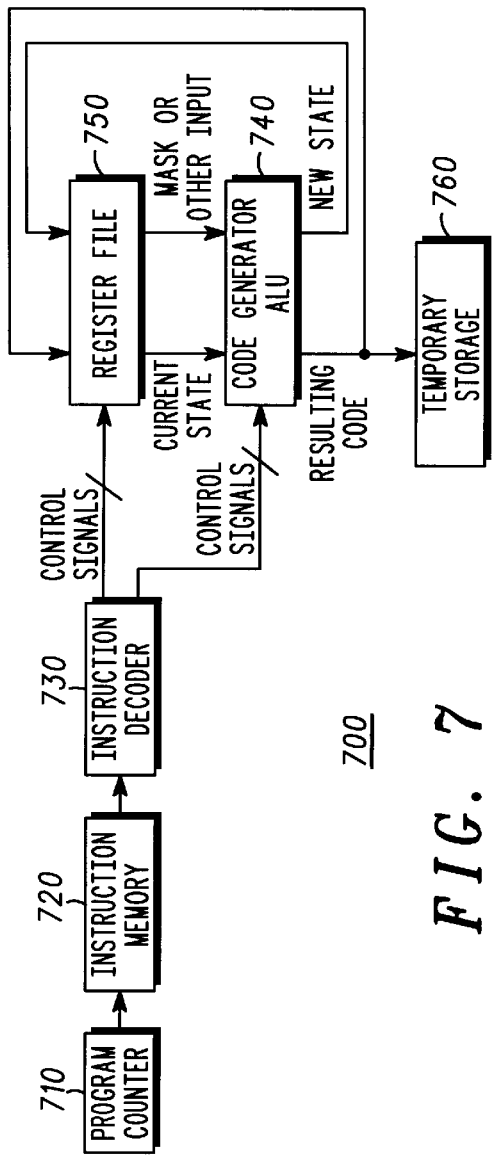
FIG. 7 is a block diagram of one embodiment of a programmable code generator with a temporary storage register, in accordance with the current invention.

FIG. 7 shows a block diagram of one embodiment of a programmable code generator with a temporary storage register, in accordance with the present invention at 700. Programmable code generator 700 may contain a program counter 710, an instruction memory 720, an instruction decoder 730, a code-generation ALU 740, and a general-purpose register file 750 in correspondence with similar elements in FIG. 1. In this implementation, code-generation ALU 740 may create two outputs. One may be the next state value used by the code generator, and the other may be the actual value in the code sequence. The resulting code value may either be stored in register file 750 or it may be stored in a temporary storage register 760 to be used in a later instruction or by another ALU. Providing this extra output allows code-generation ALU 740 to avoid repeating similar operations to create the state information and the code sequence information.

Temporary storage register 760 may increase the flexibility and efficiency of the architecture. For example, temporary storage register 760 may be used to transfer the resulting code directly to a correlation ALU. This reduces the need to fetch and store an extra piece of data from the register file thereby reducing the number of ports on the register file and its concomitant power consumption. As another example, temporary storage register 760 may serve as a shift register that can concatenate several results from several consecutive instructions. In this way, a completely new state may be constructed as needed during a PN slewing (i.e., code phase advancing or retarding) operation. As another example, intermediate terms may be stored in temporary storage register 760 to aid in the generation of longer length (>N) pseudo-noise code sequences, where N is the length of a pseudo-noise vector for cases where N is larger than the width of code-generation ALU 740. Register file 750 may also be used to store intermediate terms to aid in the generation of longer length pseudo-noise code sequences when N is larger than the width of code-generation ALU 740. A plurality of intermediate terms may be stored in a register file of K-bits in width, and an N-length polynomial pseudo-noise code sequence may be generated, where N is the length (in delay element stages) of the equivalent linear-feedback shift register as dictated by the particular protocol. In general, K may be greater than or equal to M, where M is the length or number of bits of the generated pseudo-noise vector that may be generated in parallel.

Figure 8:
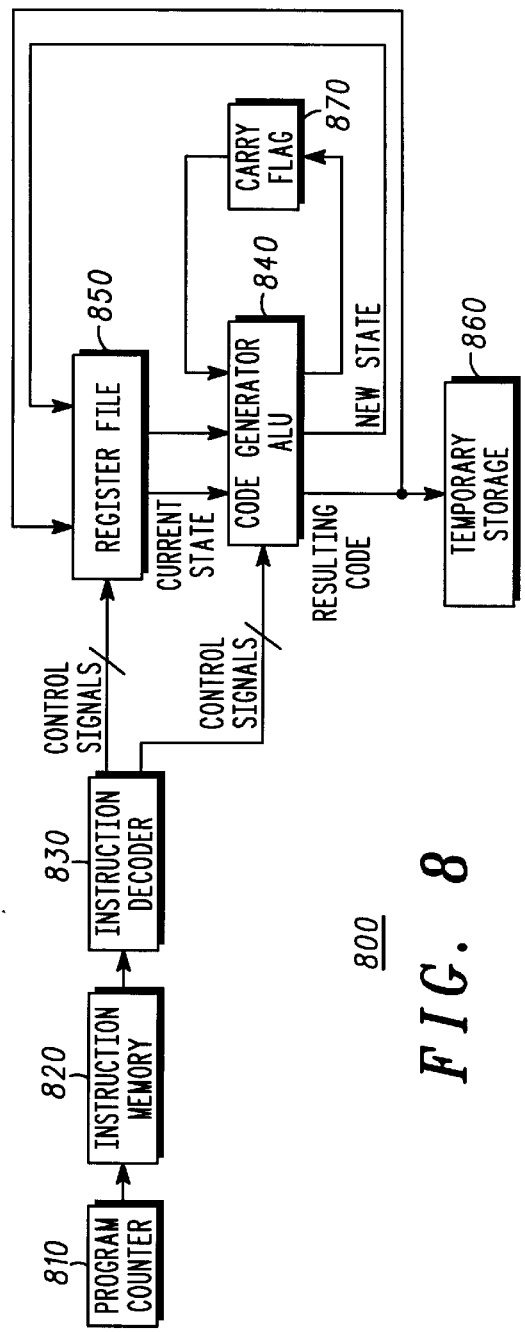
FIG. 8 is a block diagram of one embodiment of a programmable code generator with a temporary storage register and a carry register, in accordance with the current invention.

FIG. 8 shows a block diagram of one embodiment of a programmable code generator with a temporary storage register and a carry register, in accordance with the present invention at 800. Programmable code generator 800 may contain a program counter 820, an instruction memory 820, an instruction decoder 830, a code-generation ALU 840, and a register file 850 in correspondence with similar elements in FIG. 1, along with temporary storage register 860. In this implementation, a specialized register, a carry flag or carry register 870, may be used to hold intermediate results from code-generation ALU 840. Temporary storage register 860 allows a single code to be calculated over several clock cycles using instructions stored in instruction memory 820.

Figure 9:
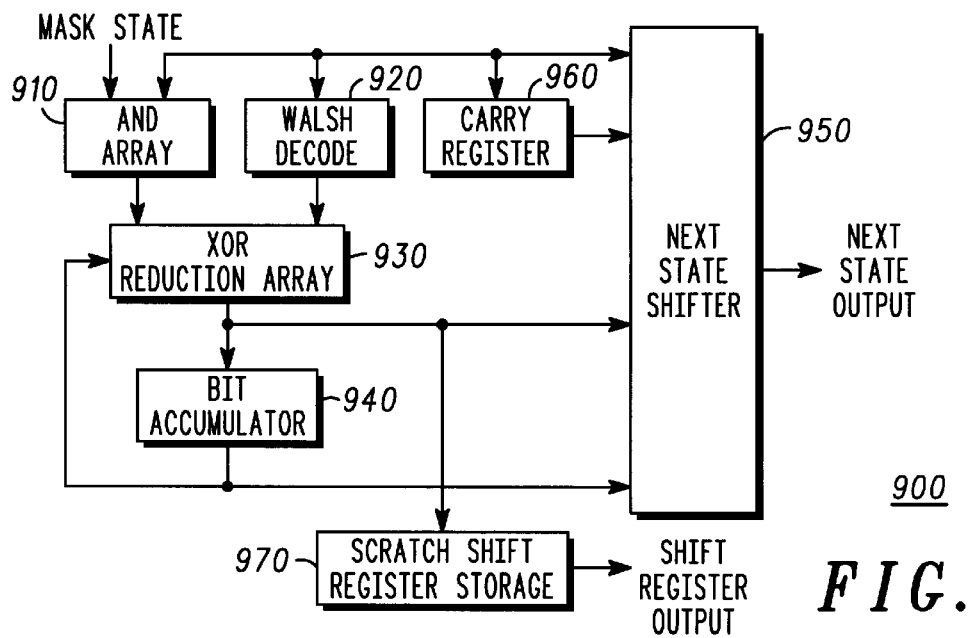
FIG. 9 is a block diagram of one embodiment of a PN code sequence generation arithmetic logic unit, in accordance with the current invention.

A block diagram of one embodiment of a PN code sequence generation ALU in accordance with the present invention at 900 is shown in FIG. 9. PN code sequence generation ALU 900 includes mask and state input to AND array 910, Walsh decode 920, XOR reduction array 930, bit accumulator 940, next-state shifter 950, carry register 960 and scratch-shift registers 970. The mask and state may be outputs from a general-purpose register file, and the next state output may be written back to the register file and code sequence generation ALU 900. The AND array 910 may perform modulo-2 multiplication of the coefficients defined by the mask and the current PN State. Carry register 960 may be used to save state information when the PN sequence is longer than the bit width of the general-purpose register file where the state may be stored. The number of bits in carry register 960 may depend on the number of PN sequences being generated in one clock cycle. XOR reduction array 930 may perform all modulo-2 additions needed to generate the next set of PN sequences. XOR reduction array 930 may be in the form to generate many PN sequence bits in parallel, as shown in FIG. 4. The new PN sequence bits may be stored in bit accumulator 940, or may be routed to next-state shifter 950 to generate the next PN state. The number of bits in bit accumulator 940 may depend on the number of PN bits being generated in one clock cycle. Next-state shifter 950 may shift its contents left by the number of bits being generated in one clock cycle. Next-state shifter 950 may be programmed to add the output of XOR reduction array 930, bit accumulator 940, or carry register 960 into the lower bits of next-state shifter 950. Output from XOR reduction block 930 may be saved in a set of scratch shift registers 970. The contents of scratch registers 970 may be used during PN stewing for temporarily storing state data until the slewing operation is complete. Walsh decode block 920 may be combined with mask and state input to generate orthogonal Walsh code sequences using the same hardware blocks. Other hardware blocks may be added to increase the code-generation rate or the number of parallel bits generated per clock cycle.

Figure 10:
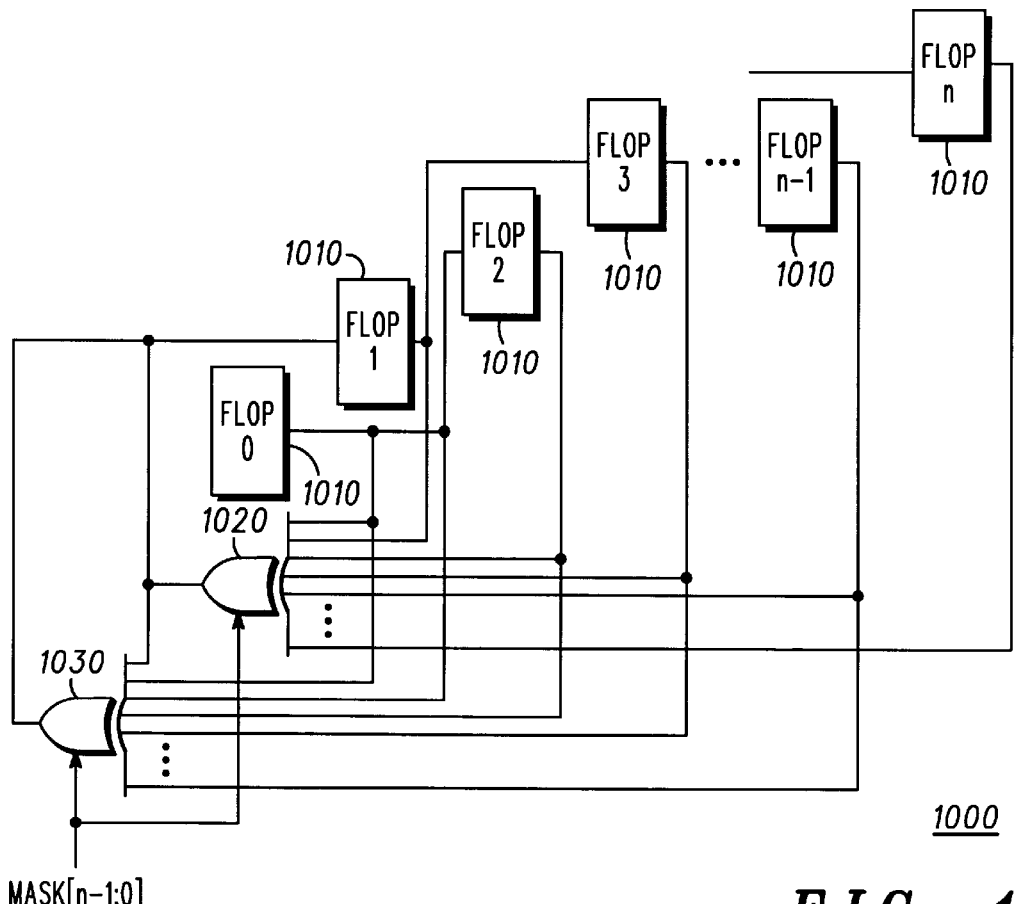
FIG. 10 is a block diagram of one embodiment of a PN code sequence generator that generates two bits at a time, in accordance with the current invention.

FIG. 10 shows a block diagram of one embodiment of a PN code sequence generator that generates two bits at a time, in accordance with the present invention at 1000. Two-bit code sequence generator 1000 may be comprised of a set of N+M−1, where M=2, flip-flops 1010, a first set of combination and reduction logic 1020, and a second set of combination and reduction logic 1030. Combination and reduction logic 1020 may provide one bit of PN code, operating on state inputs from flip-flops 1 through n. Combination and reduction logic 1030 may provide a second bit of PN code, operating on state inputs from flip-flops 0 through n−1 and the output from combination and reduction logic 1020. Mask [n−1:0] values may be provided to each combination and reduction logic block. Mask and state input to combination and reduction logic 1030 provides a second bit of code using feed-forward connections in an alternative look-ahead technique.

Figure 11:
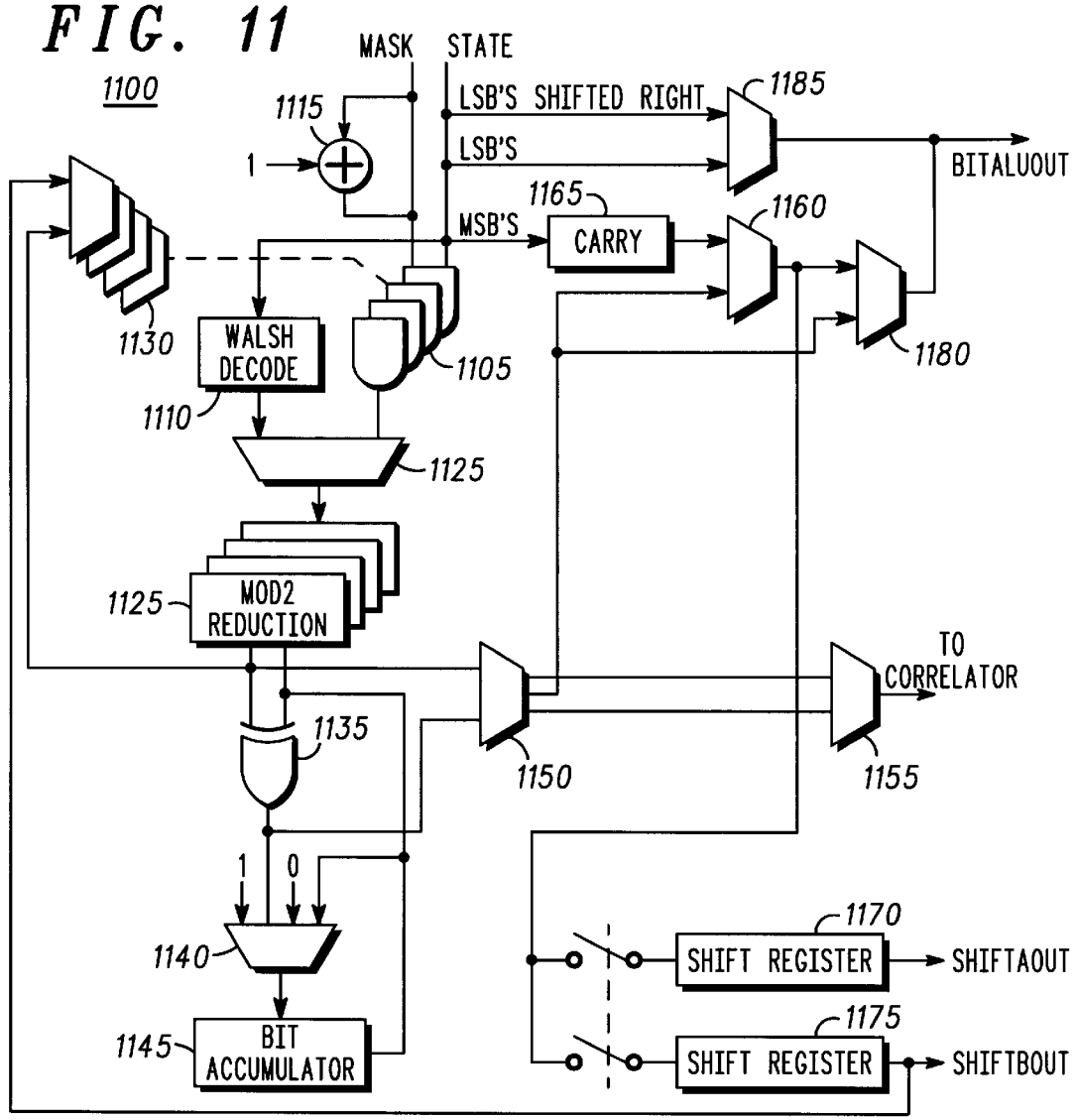
FIG. 11 is a block diagram of one embodiment of a code-generation arithmetic logic unit, in accordance with the current invention.

FIG. 11 shows a block diagram of one embodiment of a code-generation ALU that may generate multiple PN bits at a time, in accordance with the present invention at 1100. PN code-generation ALU 1100 may generate, for example, four PN bits in parallel that combine mask and state information to generate the new code. PN code-generation ALU 1100 may generate more PN bits in parallel, up to the width of the ALU. Registers in the register file, temporary or scratch registers, or carry registers may be used to generate even more PN bits in parallel based on the control signals, current state input and mask input, although in some cases more than one clock cycle may be needed. Traditional pipelining techniques may be used in the design of the ALU or processors with no loss in generality of the described invention. PN code-generation ALU 1100 may be programmed to generate longer PN codes, and other types of orthogonal and spreading codes. PN code generator ALU 1100 may be comprised of combinatorial logic blocks 1105; Walsh decode logic 1110; Walsh row adjust logic 1115; multiplexers 1120, 1130, 1140, 1150, 1155, 1160, 1180, and 1185; reduction logic blocks 1125; bitwise XOR logic block 1135; bit accumulator 1145; carry register 1165; and shift registers 1170, 1175.

Mask and state information may be provided to combinational logic blocks 1105, and depending on control signals to multiplexer 1120, may be reduced by reduction logic blocks 1125 and fed to multiplexer 1130, bitwise XOR logic block 1135, or multiplexer 1150. Walsh decode logic 1110 may serve to generate Walsh code from state information, and pass the information through multiplexer 1120. Walsh row adjust logic 1115 may be used to provide a pass through for state information applied to combination logic blocks 1105. The output of bitwise XOR logic block 1135 may pass through multiplexer 1140. Multiplexer 1140 may also pass a set of logical ones or a set of logical zeroes to bit accumulator 1145. The data or state information from reduction logic block 1125 may pass through multiplexer 1150 and through multiplexer 1155 to a correlator, or pass through multiplexer 1150 through multiplexer 1160 and multiplexer 1180 to bitALUout. A portion of the state information may pass through multiplexer 1185 to bitALUout, and another portion of the state information may be stored temporarily in carry register 1165, passed through multiplexer 1160 and multiplexer 1180 to bitALUout. Output from multiplexer 1160 may be accumulated in shift register 1170 or shift register 1175, and provided to shiftaout or shiftBout, accordingly. Data or state information passing through the multiplexers and various registers may be controlled by control signals generated by the instruction decoder. These logic blocks and function blocks may generate a variety of codes in response to code-generation instructions. Code-generation ALU 1100 may be used to generate the PN sequences used, for example, in CDMA systems, and other types of code sequences.

Figure 12:
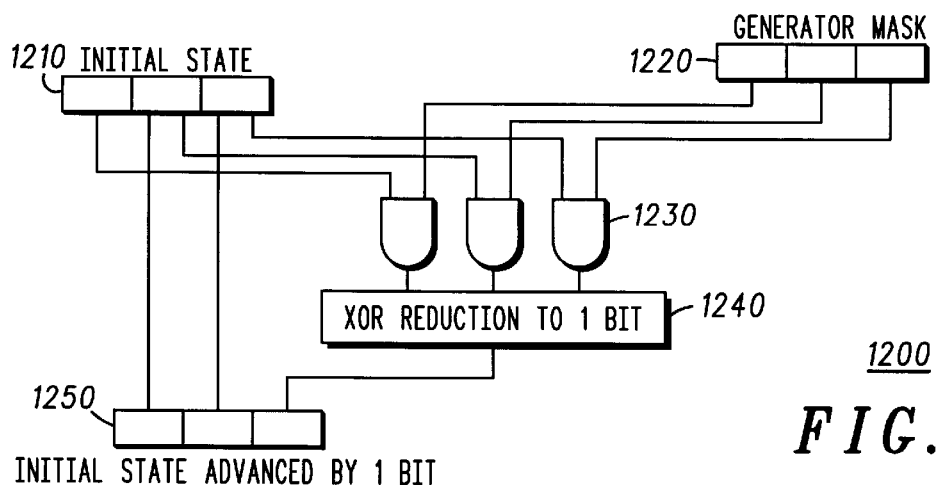
FIG. 12 is a flow diagram of one embodiment of a method for generating one bit of PN code per clock cycle with a code-generation arithmetic logic unit, in accordance with the current invention.

To generate a linear feedback shift register (LFSR) implementation of a single-chip PN generation code, the state and mask registers of code-generation ALU 1100 may be used to designate the generator polynomial of the PN sequence. FIG. 12 shows a flow diagram of one embodiment of a method for generating one bit of PN code per clock cycle with a programmable code-generation ALU, in accordance with the present invention at 1200. For simplicity, only three bits are shown for the state and mask in FIG. 12, although the PN code may be any length. Blocks 1210 indicate the values and positions of the initial state, with the newest bit located towards the right. Blocks 1220 indicate the values and positions of the generator mask. State and mask information may be multiplied (modulo-2) by AND gates 1230, and reduced with XOR reduction logic 1240 to provide a single-bit output. The single-bit output may be placed into the newest state in blocks 1250, with the previously state values shifted over by one bit, and the oldest state bit in blocks 1210 discarded to form a new state. This process may be repeated N times to generate the next N bits of the PN sequence from the given initial state.

Figure 13:
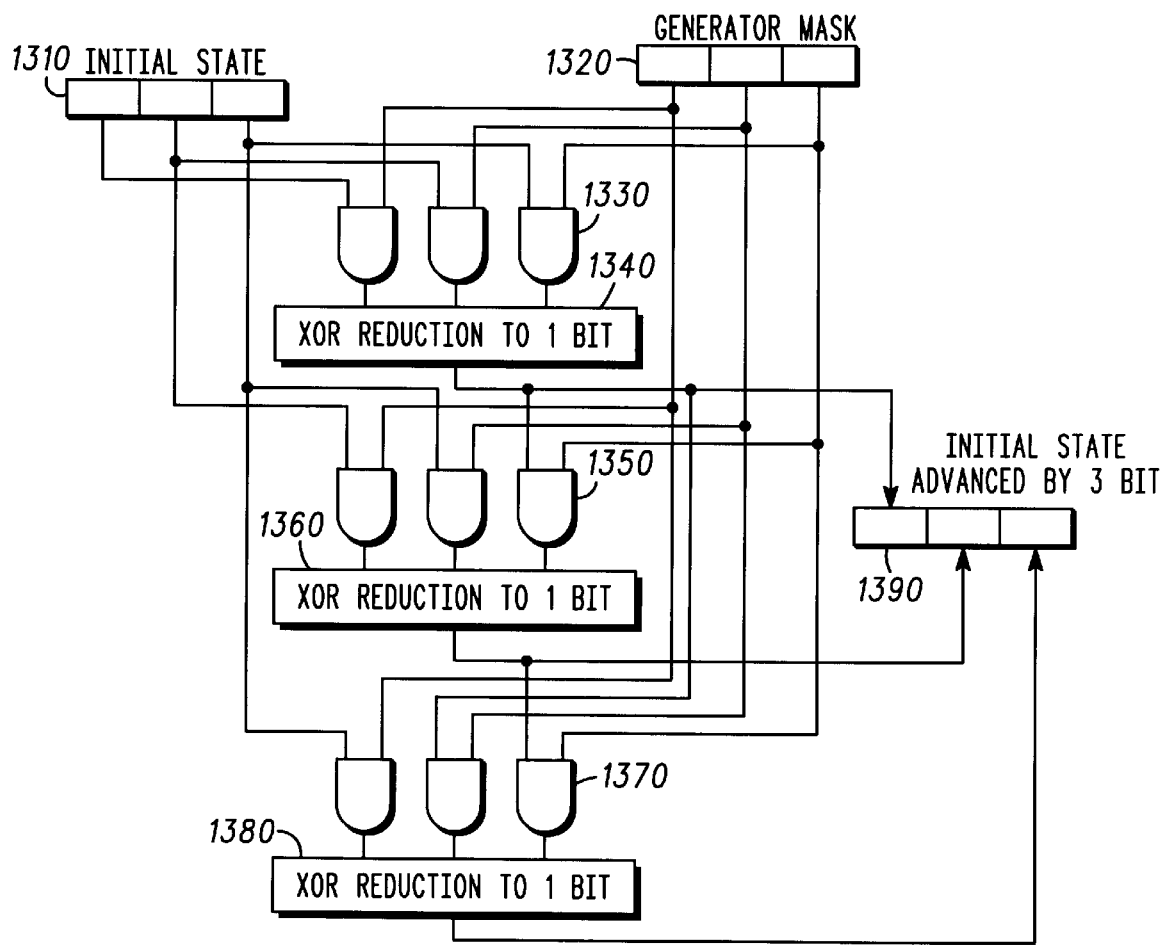
FIG. 13 is a flow diagram of one embodiment of a method for generating three bits of PN code per clock cycle with a code-generation arithmetic logic unit, in accordance with the current invention.

To generate M consecutive PN bits per clock cycle, the same generator mask may be applied to M different shifted versions of the initial state. Because the shifted version of the initial states need the new bits generated, the newly generated bits may ripple. When faster operation speed is needed, methods similar to carry-lookahead or carry-save adder techniques, known to those skilled in the art, may be applied to reduce the ripple time. FIG. 13 illustrates an implementation of the multi-bit PN generation per clock cycle with code-generation ALU 1100.

FIG. 13 shows a flow diagram of one embodiment of a method for generating three bits of PN code per clock cycle with a programmable code-generation ALU, in accordance with the present invention at 1300. Three bits are shown in this illustration, though the PN code may be of any length. Blocks 1310 indicate the positions of the initial state, with the newest bit located towards the right. Blocks 1320 indicate the positions of the generator mask. State and mask information may be multiplied (modulo-2) by AND gates 1330 and reduced by XOR reduction logic 1340 to provide a single-bit output. The single-bit output from XOR reduction logic 1340 may be fed to AND gates 1350, along with shifted initial state information and the generator mask information. The combined shifted-state information and the mask information may be reduced by XOR reduction logic 1360 to a single bit, which may be fed to AND gates 1370 along with twice-shifted initial state information and the generator mask information. The combined twice-shifted initial state information and mask information may be reduced by XOR reduction logic 1380. Single-bit outputs from XOR reduction logic 1340, 1360 and 1380 may be transferred to blocks 1390, with the right-most position indicating the initial PN state advanced by three bits.

Code-generation ALU 1100 may be configured to quickly advance or retard (i.e., slew) the initial PN state by M bits (or chips). Slewing of PN code sequences may be performed to quickly advance or retard an initial PN state by M bits. This operation may require an initial state, a generator mask, and a jump by M mask. To completely create a new state advanced by M-bits ahead, N bits of information may need to be generated, where N is the degree of the generator polynomial for the PN sequences. To expedite the creation of these N bits of M-bits ahead states, a shift register may be used to hold the intermediate values of the partial states, in that M bits of N bit states may be created per instruction cycle.

Figure 14:
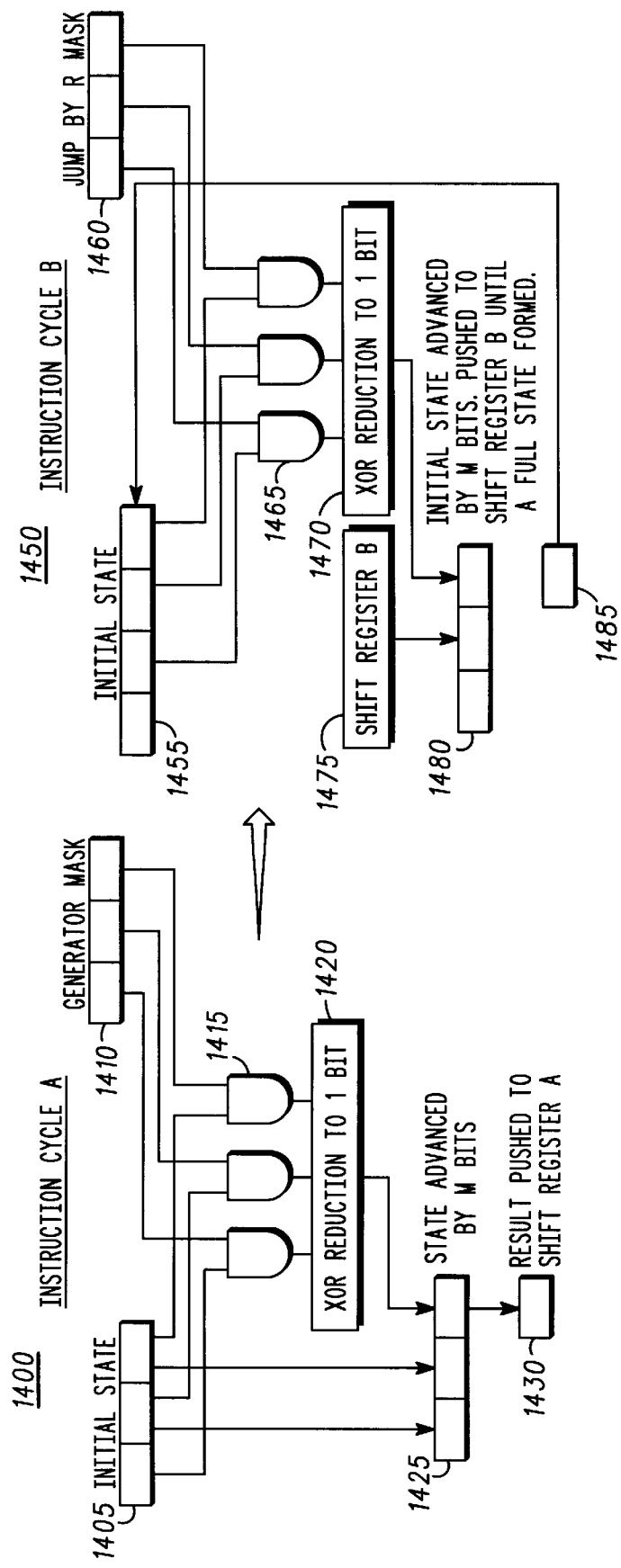
FIG. 14 is a flow diagram of one embodiment of a method for PN slewing with a code-generation arithmetic logic unit, in accordance with the current invention.

FIG. 14 shows a flow diagram of one embodiment of a method for slewing PN code using a programmable code-generation ALU, in accordance with the present invention at 1400 and 1450. A jump-by-R slew for a PN code of length three is illustrated, although the PN code length may be much longer. During instruction cycle A at 1400, an initial state 1405 may be provided along with generator mask input 1410. State input and generator mask input may be combined by AND gates 1415, and modulo-2 added by XOR reduction logic 1420. Input state values may be shifted by one place, and the result of the XOR reduction placed into the newest bit position to form new state 1425. The bit at position 1430 may be written into a shift register, such as shift register 1170 as shown in FIG. 11. During instruction cycle B at 1450, the initial state 1455 may be updated to include the value in bit position 1485 generated during instruction cycle A at position 1430. The updated initial state 1455 and jump-by-R mask 1460 may be combined by AND gates 1465 and modulo-2 added by XOR reduction logic 1470. The resulting bit from XOR reduction logic 1470 may be placed in block 1480 along with output from shift register 1475 corresponding to, for example, shift register 1175 as shown in FIG. 11, providing the initial state advanced by M bits.

Figure 15:
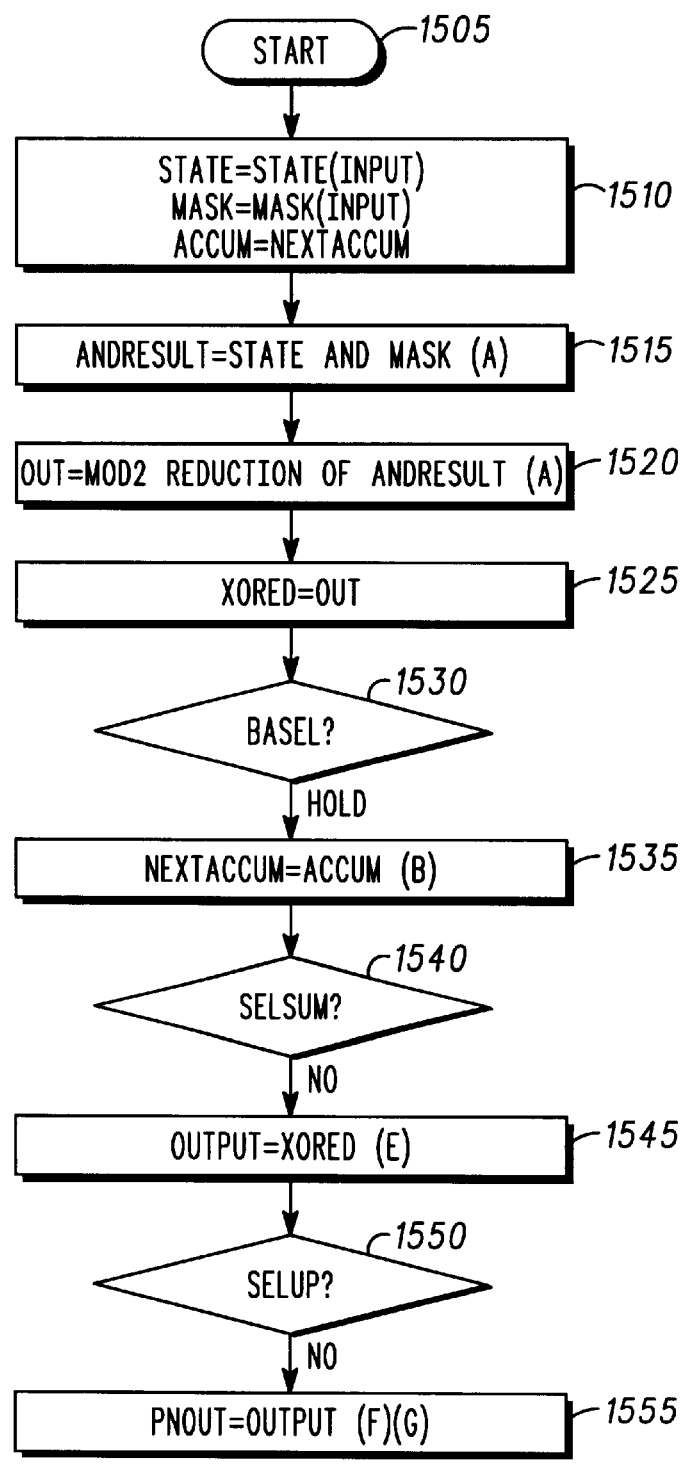
FIG. 15 is a flow chart of one embodiment of a method for PN generation with a code-generation arithmetic logic unit, in accordance with the current invention.

FIG. 15 shows a flow diagram of one embodiment of a method for the generation of PN code with a programmable code-generation ALU, in accordance with the present invention at 1500.

PN code-generation method 1500 begins at block 1505. As shown at block 1510, a current state may be set equal to an initial input state, a mask may be set equal to a generator mask input, and an intermediate variable accum may be set equal to the value NextAccum. The state and mask inputs may be combined to produce andResult, as shown at block 1515. A modulo-2 reduction of andResult may produce the intermediate value out, as shown at block 1520. Operations 1515 and 1520 may be completed using, for example, combination and reduction logic 510 of FIG. 5, to produce the intermediate variable xored, as shown at block 1525. The PN code generation may proceed with control signal baSel set equal to hold as shown at block 1530, with intermediate variable NextAccum set equal to accum as shown at block 1535 in accordance with multiplexer 520 and M-bit accumulator 530 in FIG. 5. For PN code generation, control signal selSum may be set equal to zero as shown at block 1540 in correspondence with multiplexer 540 of FIG. 5, and the intermediate variable output set equal to xored, as shown at block 1545. As shown at block 1550, control signal selUp may be set equal to zero in correspondence with multiplexer 550 of FIG. 5 for PN code generation, and the final variable PNout may be set equal to the intermediate variable output, as shown at block 1555.

Programmable code-generation ALU 1100 may be configured to generate Gold codes. To generate Gold codes in this example, the states and masks may be applied to programmable code-generation ALU 1100 in a different manner. Gold codes may be constructed from two maximal-length LFSR PN codes X and Y XORed with one another. PN code Y may be a delayed or advanced version of PN code X, although for full generality, it may be assumed that they are composed of unrelated initial states and unrelated generator masks.

Figure 16:
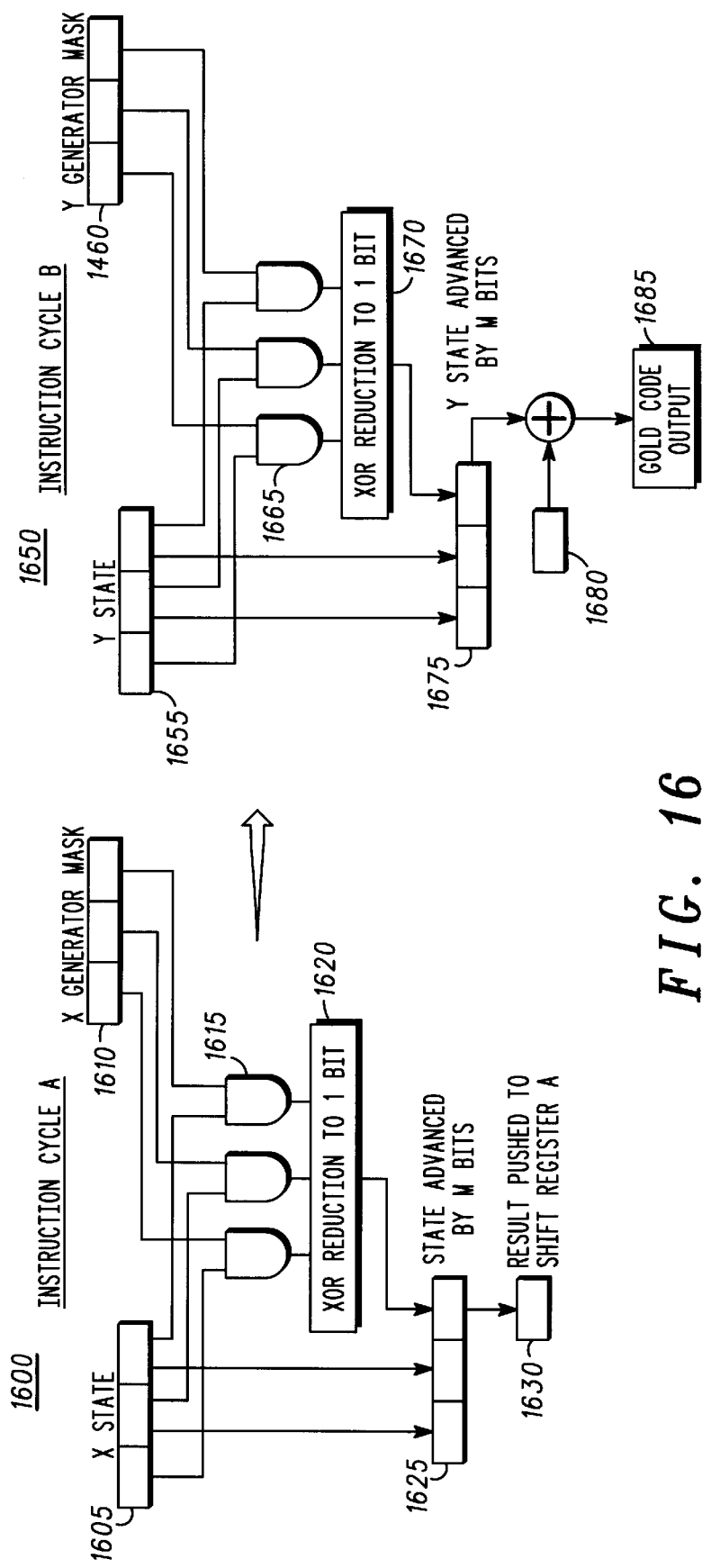
FIG. 16 is a flow diagram of one embodiment of a method for Gold code-generation with a code-generation arithmetic logic unit, in accordance with the current invention.

FIG. 16 shows a flow diagram of one embodiment of a method for Gold code generation using a programmable code-generation ALU at 1600 and 1650, in accordance with the present invention. During instruction cycle A at 1600, PN code X may be generated based on X-state input 1605 and X-generator mask 1610. The resulting bit generated by combinational logic 1615 and XOR reduction logic 1620 may be pushed into a bit accumulator and also placed into new PN state 1625, along with shifted values from X-state input 1605. Instruction cycle B at 1650 combines Y-state input 1655 with Y-generator mask 1660 through combination logic 1665 and reduction logic 1670 to produce a new Y state 1675 advanced by M bits. New Y state 1675 may be combined with new X-state 1680 from bit accumulator 1630 to form Gold code output 1685.

Figure 17:
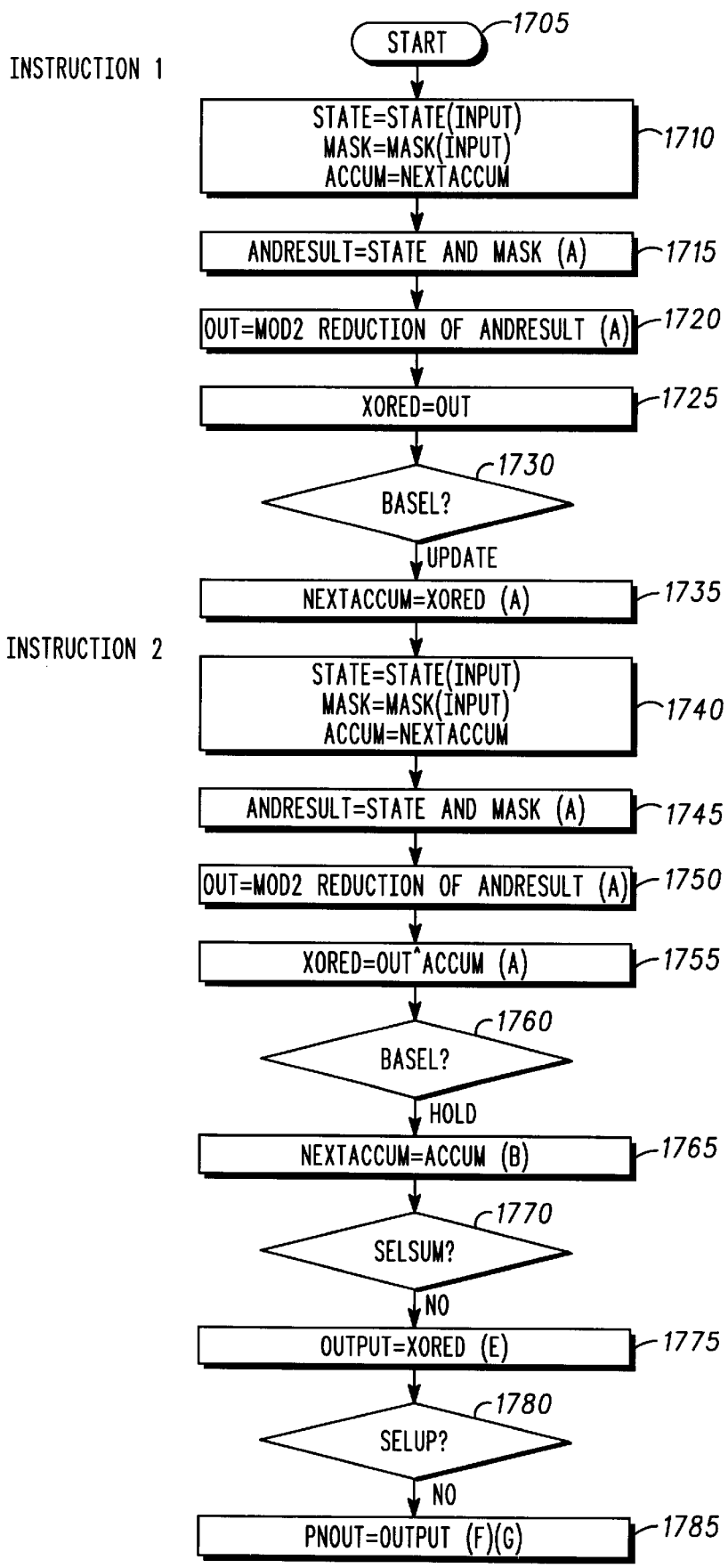
FIG. 17 is a flow chart of one embodiment of a method for Gold code generation with a code-generation arithmetic logic unit, in accordance with the current invention.

FIG. 17 shows a flow chart of one embodiment of a method for Gold code generation with a programmable code-generation ALU, in accordance with the present invention at 1700. Gold code-generation method begins at block 1705, and initiates the state, mask and accum values with the state input, mask input and NextAccum values, respectively, as shown at block 1710. The state and mask values may be combined to generate intermediate variable andResult, as shown at block 1715. Intermediate variable out may be set to the modulo-2 reduction of andResult as shown at block 1720, and the intermediate variable xored set equal to the intermediate variable out, as shown at block 1725. With the baSEL control signal set to update, as shown at block 1730, the intermediate variable NextAccum may be set equal to xored, as shown at block 1735. The second instruction may begin, as shown at block 1740. The state, mask and accum variables may be initiated with the state input, mask input and NextAccum values, respectively, as shown at block 1740. The state and mask inputs are likely different than the inputs set in block 1710 to provide an offset PN code. The state and mask inputs may be combined, as shown at block 1745, and reduced to produce intermediate value out as shown at block 1750. The intermediate value out may be combined with accum to produce the intermediate value xored, as shown at block 1755. The control signal baSel may be set to hold, as shown at block 1760, such that the intermediate value NextAccum may remain unchanged, as shown at block 1765. The control signal selSum may be set equal to 0, as shown at block 1770, so that the intermediate value output may be set equal to the intermediate variable xored, as shown at block 1775. As shown at block 1780, the control variable selUp may be set equal to 0, so that final value PNout may be set equal to the intermediate variable output, as shown at block 1785.

Programmable code-generator ALU 1100 may be configured to generate Walsh codes. Walsh codes are comprised of elements of a Hadamard matrix. More specifically, Walsh sequences are identical to the rows of the Hadamard matrix. Instead of state and mask values as inputs, the Walsh code generation may take the column address and the row address of the Hadamard matrix.

Figure 18:
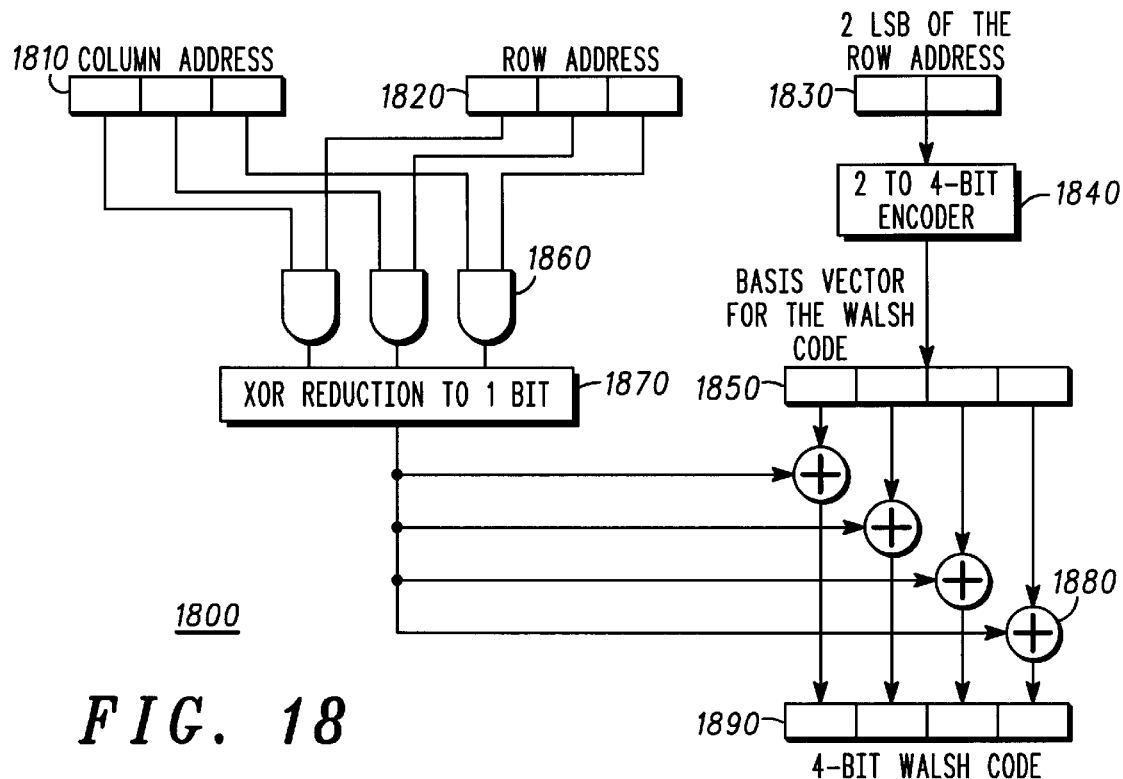
FIG. 18 is a block diagram of one embodiment of a method for Walsh code generation with a code-generation arithmetic logic unit, in accordance with the current invention.

FIG. 18 shows a block diagram of one embodiment of a method for generating Walsh code using a programmable code-generation ALU in accordance with the present invention at 1800. For example, to generate elements of the $12^{th}$ row, $4^{th}$ column of the Hadamard matrix, the column address 1810 may be set to four, and the row address 1820 may be set to twelve. The two least significant bits 1830 of the column address may be used to generate the first four bits of a Walsh code basis vector 1850 using a two to four-bit encoder 1840. These four bits may signify the bits in column 0, 1, 2, and 3 of the particular Walsh row. The rest of the column address may be ANDed by combinational logic 1860, and XORed by reduction logic 1870, with the row addresses and column addresses reduced to one bit. This bit may then be used to XOR the four bits generated by encoder 1840 using XOR logic 1880 to generate the four bits of Walsh code 1890 starting at the row and column of the address specified. Alternatively, the column address may be incremented within the code-generation ALU to generate the elements of the desired Walsh sequence (through the use of the AND-XOR reduction logic and row address).

Code generator ALU 1100 may be configured to generate OVSF codes. OVSF codes may be generated in a similar fashion to Walsh Codes. In this case, the row indexing of the OVSF codes may be bit reversed.

Figure 19:
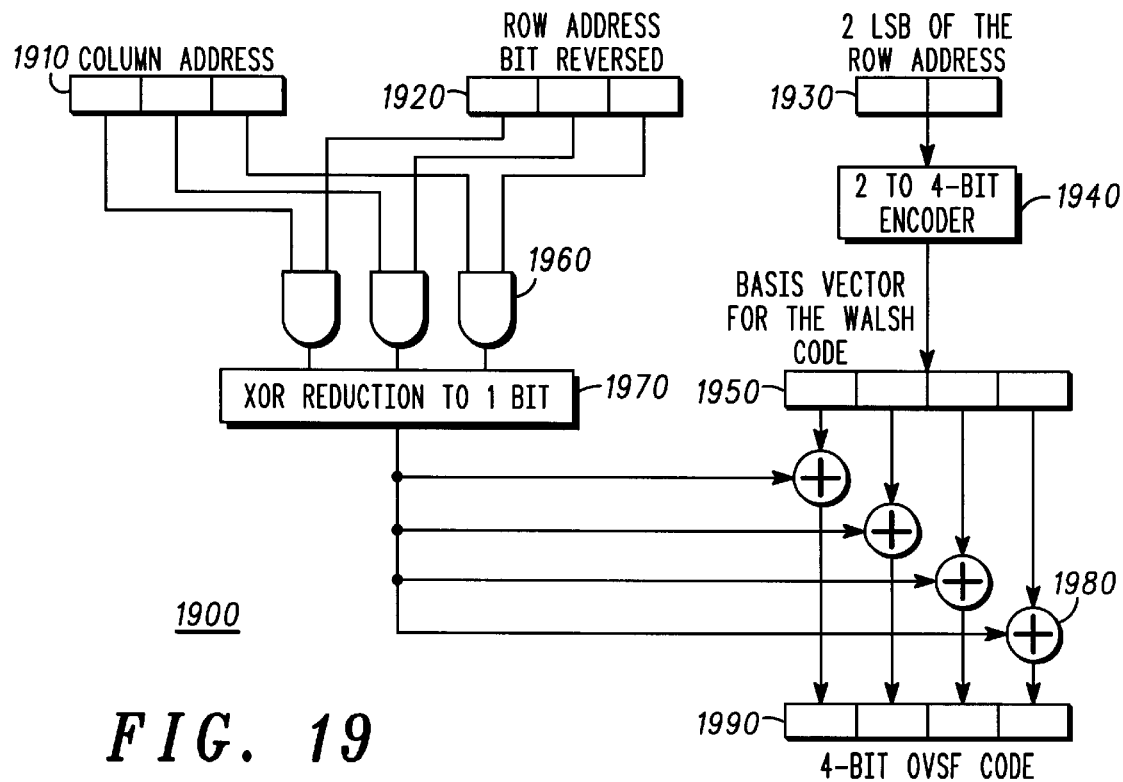
FIG. 19 is a block diagram of one embodiment of a method for orthogonal variable spreading factor code generation with a code-generation arithmetic logic unit, in accordance with the current invention.

FIG. 19 shows a block diagram of one embodiment of a method for generating OVSF codes with a programmable code generator, in accordance with the present invention at 1900. For example, to generate an OVSF code, column address 1910 and row address 1920 may be set. Taking advantage of the fact that the Hadamard matrix is symmetric, either the row or the column address may be bit reversed to generate the OVSF codes. In this implementation, row address 1920 may be flipped once compared to flipping the column address M times, to minimize the overhead time required to reverse the bits. The two least significant bits 1930 of row address 1920 may be used to generate the first four bits of a Walsh code basis vector 1950 using a two to four-bit encoder 1940. The rest of column address 1910 may be ANDed by combinational logic 1960, and XORed by reduction logic 1970, with the row addresses and column addresses reduced to one bit. This bit may then be used to XOR the four bits generated by encoder 1940 using XOR logic 1980 to generate the four bits of OVSF code 1990 starting at the row and column of the address specified.

Code generator ALU 1100 may be configured to generate user-defined codes or any predefined code, such as a synchronization code for 3GPP CDMA mobile phone systems. To generate the synchronization codes for 3GPP, a state may be given as the hierarchical Golay sequences. The mask given may pick out the oldest bits of the sequences and replace them as the newest bits in the state.

Figure 20:
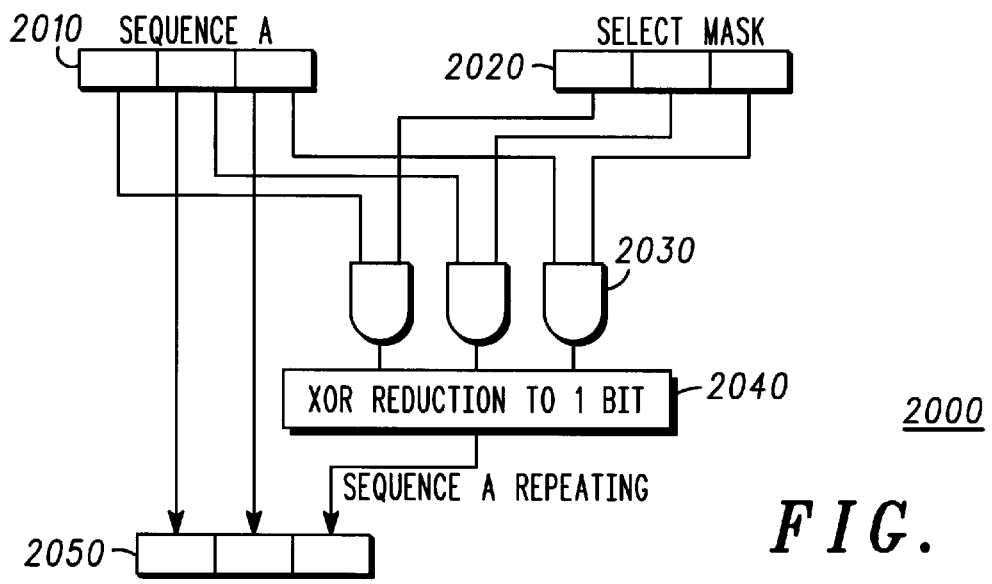
FIG. 20 is a block diagram of one embodiment of a method for synchronization code generation with a code-generation arithmetic logic unit, in accordance with the current invention.

FIG. 20 shows a block diagram of one embodiment of a method for generating synchronization code using a programmable code-generator ALU, in accordance with the present invention at 2000. Sequence A may be inserted into sequence block 2010, and a selector mask may be inserted into selector mask block 2020. The sequence and the mask may be reduced by combinatorial logic 2030 and reduction logic 2040, with the resulting bit placed in the newest state position in synchronization code block 2050, along with shifted bits of sequence A.

In the above descriptions of the invention, single or real data paths are assumed for simplicity in explaining the operational details. However, the same concepts may be applied to complex valued data paths (consisting of real and imaginary components) by replicating the described hardware structures. In one of the preferred embodiments of the invention, packed complex data paths are utilized, where the most significant half of the data path may contain real signal components, and the least significant half of the data path may contain imaginary signal components. Those skilled in the art may recognize that several different implementation forms of complex data processors exist, which do not depart from the spirit of the invention.

Figure 21:
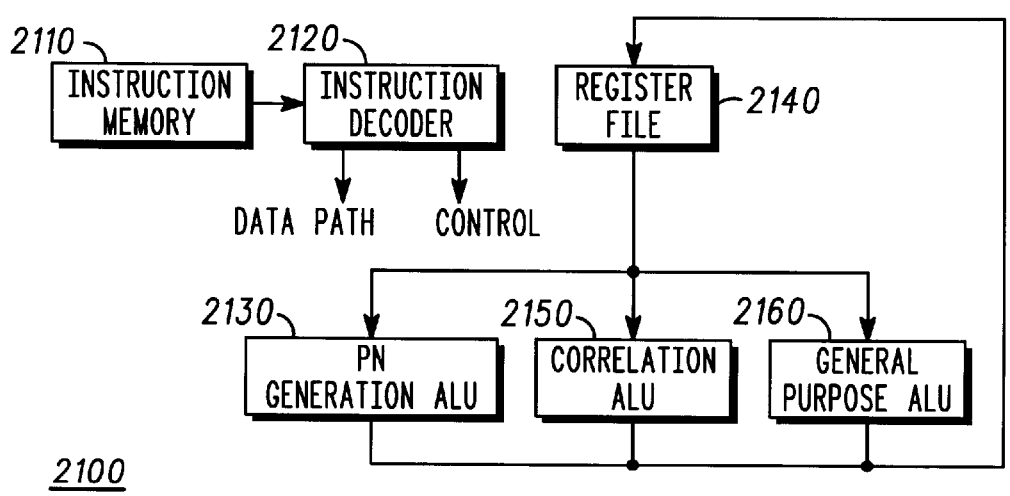
FIG. 21 is a block diagram of one embodiment of a CDMA processor system including a code-generation arithmetic logic unit, in accordance with the current invention.

FIG. 21 shows a block diagram of one embodiment of a CDMA processor system including a programmable code generator with a PN code-generation ALU, in accordance with the present invention at 2100. Note that the data paths may be of a packed complex data format as described above. CDMA processor system 2100 may be programmable through instructions that reside in instruction memory 2110, and may be fetched and decoded by instruction decoder 2120. Data path and control signals from instruction decoder 2120 may determine the generation and flow of code sequences by PN code-generation ALU 2130. PN code-generation ALU 2130 may receive and store state, mask and sequence generation information in register file 2140. Registers in register file 2140 may have one or more output ports. Correlation ALU may receive code sequence information directly from PN code-generation ALU 2130 or from register file 2140. Note also that the sequence from the PN code-generation ALU may be modified before sending it to the correlation ALU. For example, frequency offsets in the incoming signal may be compensated for by rotating the complex PN sequence generated by the code-generation ALU. General-purpose ALU 2160 may receive or send information directly with PN generation ALU 2130, register file 2140 or correlation ALU 2150. General-purpose ALU 2160 may operate in coordination with PN generation ALU 2130, register file 2140 and correlation ALU 2150 to provide most CDMA functions. Similar ALU structures may be applied to a variety of processor architectures, such as processors that share instruction and data memories, VLIW processors, single instruction multiple data (SIMD) processors, vector processors, multiple-data multiple-instruction processors (MIMD), and superscalar processors, without loss of generality.

CDMA processor system 2100 may contain software for selecting a code type, and storing, updating, augmenting or updating instructions stored in instruction memory 2110 corresponding to the desired code type and system requirements. The processor system may be used in a multi-mode CDMA transceiver, or in a software-defined radio. The code type may be selected based on the protocol of an incoming call or outgoing call, or according to the CDMA standards by which the transceiver is intended to support. The code type may be selected over the air. The processor system may also be used in encryption devices, such as those used in the transmission of secured data over the Internet, local area networks (LANs) or wide area networks (WANs).

Other topologies of the described architectures are possible without departing from the essential characteristics of the current invention. For example, the register file may be replaced by a general storage or memory architecture (e.g., random access memory, electrically erasable read-only memories, etc.), and the arithmetic logic units may be connected directly to the memory architecture. Those skilled in the art may recognize that different varieties of connections between the arithmetic logic units, register files, and storage elements are possible without departing from the spirit of the invention.

While the embodiments of the invention disclosed herein are presently preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for generating a code sequence, comprising:
   receiving a code-generation instruction from an instruction memory;
   determining control signals based on the code-generation instruction; and
   generating the code sequence based on the determined control signals, a current state input, and a mask input; wherein the code sequence is generated by a code-generation arithmetic logic unit from the current state input, the mask input, and the determined control signals, and wherein the control signals are determined by an instruction decoder based on the received code-generation instruction from the instruction memory.

2. The method of claim 1 wherein the generated code sequence is a code type selected from a group consisting of a spreading code, a covering code, an orthogonal code, a synchronization code, a pseudo-noise code, a slewed pseudo-noise code, an arbitrary-length pseudo-noise code, an m-sequence code, a Walsh code, an orthogonal variable spreading factor code, a Gold code, a 3GPP hierarchical code, a frequency-corrected code sequence, a user-defined code sequence, and a predefined code sequence.

3. The method of claim 1 wherein the code-generation instruction is selected from a group consisting of a logic instruction, an arithmetic instruction, a shift instruction, a rotate instruction, a move instruction, a pack instruction, an unpack instruction, a flip instruction, a load instruction, a pseudo-noise generate instruction, a multiple pseudo-noise generate instruction, a Walsh generate instruction, and a multiple Walsh generate instruction.

4. The method of claim 1 further comprising:
   generating a set of terms for a next state input based on the control signals, the current state input, and the mask input.

5. The method of claim 1 further comprising:
   storing a plurality of intermediate terms in a register file; and
   generating M sequential bits of a specified pseudo-noise code sequence, wherein M is a length of a generated pseudo-noise vector.

6. The method of claim 1 further comprising:
   generating multiple elements of a code sequence in parallel based on the control signals, the current state input, and the mask input.

7. A code-generation system, comprising:
   means for receiving a code-generation instruction from an instruction memory;
   means for determining control signals based on the code-generation instruction; and
   means for generating the code sequence based on the determined control signals, a current state input, and a mask input; wherein the code sequence is generated by a code-generation arithmetic logic unit from the current state input, the mask input, and the determined control signals, and wherein the control signals are determined by an instruction decoder based on the received code-generation instruction from the instruction memory.

8. The system of claim 7, further comprising:
   means for generating a set of terms for a next state input based on the control signals, the current state input, and the mask input.

9. The system of claim 7, further comprising:
   means for storing a plurality of intermediate terms in a register file; and
   means for generating M sequential chips of a specified pseudo-noise code sequence, wherein M is a length of a generated pseudo-noise vector.

10. The system of claim 7, further comprising:
    means for generating multiple elements of a code sequence in parallel based on the control signals, the current state input, and the mask input.

11. A code-generation system, comprising:

instruction memory;

an instruction decoder operably connected to the instruction memory;

a code-generation arithmetic logic unit operably connected to the instruction decoder; and a register file operably connected to the instruction decoder and the code-generation arithmetic logic unit; wherein code is generated by the arithmetic logic unit from a current state input, mask input from the register file, and control signals that are determined by the instruction decoder based on an instruction received from the instruction memory.

12. The system of claim 11 further comprising:

a temporary storage register operably connected to the code-generation arithmetic logic unit, wherein results from several arithmetic logic unit operations are stored.

13. The system of claim 11 further comprising:

a carry register operably connected to the code-generation arithmetic logic unit, wherein intermediate results from the code-generation arithmetic logic unit are stored.

14. The system of claim 11 further comprising;

a correlation arithmetic logic unit operably connected to the code-generation arithmetic logic unit, wherein code is transferred to the correlation arithmetic logic unit from the code-generation arithmetic logic unit.

15. The system of claim 11 further comprising:

at least one general-purpose arithmetic logic units operably connected to the register file, wherein resources of the register file are shared between the general-purpose arithmetic logic units and the code-generation arithmetic logic unit.

16. A method for generating code comprising:

selecting a code type;

generating a plurality of instructions based on the selected code type;

storing the instructions in a code-generation instruction memory; and generating a code sequence corresponding to the selected code type; wherein the code sequence is generated by a code-generation arithmetic logic unit from a current state input, mask input, and control signals from an instruction decoder, the control signals determined by the instruction decoder based on the stored instructions in the code-generation instruction memory.

17. The method of claim 16, wherein the code-generation instruction memory is located in a multi-mode transceiver.

18. The method of claim 16, wherein the code-generation instruction memory is located in an encryption device.

19. A computer usable medium including a program for generating a code sequence, comprising:

computer program code for selecting a code type;

computer program code for generating a plurality of instructions based on the selected code type;

computer program code for storing the instructions in a code-generation instruction memory, and computer program code for generating a code sequence corresponding to the selected code type; wherein the code sequence is generated by a code-generation arithmetic logic unit from a current state input, mask input, and control signals from an instruction decoder, the control signals determined by the instruction decoder based on the stored instructions in the code-generation instruction memory.

20. The computer usable medium of claim 19, wherein the computer program code resides in a software-defined radio.

21. A programmable code-generation system, comprising:

means for selecting a code type;

means for generating a plurality of instructions based on the selected code type;

means for storing the instructions in a code-generation instruction memory; and means for generating a code sequence corresponding to the selected code type; wherein the code sequence is generated by a code-generation arithmetic logic unit from a current state input, mask input, and control signals from an instruction decoder, the control signals determined by the instruction decoder based on the stored instructions in the code-generation instruction memory.

* * * * *